United States Patent
Saraf et al.

(10) Patent No.: US 10,305,396 B1
(45) Date of Patent: May 28, 2019

(54) ELECTROCHEMICAL DEVICE FOR GENERATING A TIME DEPENDENT ELECTRICAL SIGNAL

(71) Applicant: Ravi F. Saraf, Lincoln, NE (US)

(72) Inventors: Ravi F. Saraf, Lincoln, NE (US); Seungwoo Lee, Seoul (KR)

(73) Assignee: Ravi F. Saraf, Lincoln, NE (US)

( * ) Notice: Subject to any disclaimer, the term of this patent is extended or adjusted under 35 U.S.C. 154(b) by 958 days.

(21) Appl. No.: 14/793,058

(22) Filed: Jul. 7, 2015

(51) Int. Cl.
  *H02N 2/00* (2006.01)
(52) U.S. Cl.
  CPC ................. *H02N 2/0075* (2013.01)
(58) Field of Classification Search
  CPC .................................................. H02N 2/0075
  USPC ......................................................... 310/328
  See application file for complete search history.

(56) References Cited

U.S. PATENT DOCUMENTS

| | | | |
|---|---|---|---|
| 7,674,545 B2 | 3/2010 | Chun | |
| 7,898,096 B1 * | 3/2011 | Krupenkin | H02N 1/08 |
| | | | 290/1 R |
| 8,003,982 B2 | 8/2011 | Wang | |
| 8,053,914 B1 | 11/2011 | Krupenkin | |
| 8,519,596 B1 | 1/2013 | Kim | |
| 8,536,760 B1 | 9/2013 | Kim | |
| 8,598,768 B2 | 12/2013 | Jun | |
| 8,680,514 B2 | 3/2014 | Park | |
| 9,170,166 B2 * | 10/2015 | Pan | G01L 9/0072 |
| 2002/0145350 A1 | 10/2002 | Henderson | |
| 2009/0243428 A1 | 4/2009 | Qiao | |
| 2013/0119669 A1 | 5/2013 | Murphree | |
| 2014/0210313 A1 | 1/2014 | Kim | |
| 2014/0139974 A1 | 5/2014 | Carver | |
| 2014/0174189 A1 * | 6/2014 | Pan | G01L 9/0072 |
| | | | 73/724 |

OTHER PUBLICATIONS

Moon, Jeong, Lee & Pak;"Electrical power generation by mechanically modulating electrical double layers";www.nature.com/naturecommunications; Feb. 12, 2013; pp. 1-6.

Nie, Xing,Brandt and Pan. "Droplet-based interfacial capacitive sensing", Lab Chip, 2012, 12, 1110; 2012; The Royal Society of Chemistry 2012;pp. 1100-1118.

* cited by examiner

*Primary Examiner* — Thomas M Dougherty
*Assistant Examiner* — Karen B Addison
(74) *Attorney, Agent, or Firm* — William L. Botjer

(57) ABSTRACT

A method and device to produce a potential between two electrodes immersed in an ion containing fluid on application of an external stimuli that produces a temporal shear flow of the fluid at the fluid/electrode interface. The external stimuli may be, for example, contact pressure, motion, vibration, electric and/or magnetic field, fluid flow, or a combination of more than one stimuli. The potential produced may be harvested for energy, or sensing the external stimuli. A method to provide family of energy generators to harvest energy from ambient energy sources, such as, motion, fluid flow, contact pressure, and vibrations. A method to provide self-powered sensors where the potential generated may be, for example, directly transmitted to a receiver for signal processing by wireless or wired communication. A energy generator and/or sensor is a also provided.

18 Claims, 15 Drawing Sheets

Cross-sectional view at B – B'

Cross-sectional view at A – A'

Cross-sectional view at A – A'

Cross-sectional view at B – B'

Some possible cross-sectional view at A – A'

Cross-sectional view at A – A'

Cross-sectional view at B – B'

Cross-sectional view at C – C'

Cross-sectional view at D – D'

Cross-sectional view at A – A'

Cross-sectional view at B – B'

Cross-sectional view at C – C'

Cross-sectional view at D – D'

Cross-sectional view at A – A'

Cross-sectional view at B – B'

ELECTROCHEMICAL DEVICE FOR GENERATING A TIME DEPENDENT ELECTRICAL SIGNAL

BACKGROUND OF THE INVENTION

1. Field of the Invention

The present invention relates to an electrochemical device to generate time dependent electrical signal between two electrodes residing in a chamber containing fluid with dissolved ions by temporally perturbing the fluid by an external stimuli.

The ions in the fluid chamber may be from dissolved chemical compounds, such as, organic, inorganic or organometallic salts, acids or bases. The solvent is a single or multicomponent solution of water and polar organic liquids of molecular dipole moment of above 1.6 Debyes, preferably above 3 Debyes. Typically, the solvent is a fluid such as, water. Specifically, the shear flow at the fluid/electrode interface due to external stimuli perturbs the ion environment at the electrode surface to cause a difference in potential between the two electrodes. The electrodes may comprise metals, conducting polymers, polyelectrolyte films, semiconducting elements and compounds, metal filled conductive adhesives and composites, semimetals, and composites of these materials. The composite may be a heterogeneous or homogeneous mixture or a layered structure of different electrode materials. The potential difference arises from the differences in the physical and/or chemical nature of electrode/fluid surface before and/or after the temporal stimuli. The fluid, a solution of ions may also have additive suspensions, such as, colloid particles, nanoparticles, micelles, polymers, or emulsified liquid droplets to enhance the generation of potential difference between the electrodes due to the external stimuli.

The electrochemical device relates to the generation of the time dependent electrical potential between the two electrodes to make a sensor to detect the external stimuli. The electrochemical device relates to harvesting the electrical energy generated as a time dependent potential difference between the two electrodes. For example, the electrical potential produced may subsequently be used to charge an electrical capacitor to harvest electrical energy, or used as an electrical stimulation for sensor application to detect the perturbation.

The temporal perturbation caused by the external stimuli is a time dependent shear flow past the electrode surface. The overall design of the electrochemical device will depend on the nature of the external stimuli to cause temporal perturbation of the charge distribution at the fluid/electrode interface due to the shear flow. The time dependent external stimuli may be, but not limited to, contact pressure, motion, a magnetic field, an electric field or their combination. For example, by adding magnetic microparticles or nanoparticles as suspension in the fluid, on exposure of the device of a pulse of magnetic field will lead to temporal flow leading to a time dependent electric potential between the two electrodes. To cause the potential generation, the temporal shear flow has to occur on at least one of the electrode surface.

The time dependent potential difference between the electrodes is generated due to different amount of charge distribution perturbation at the two electrodes caused by the stimuli influenced shear flow at the fluid/electrode interface. The charge distribution at the electrode/fluid interface underlining is broadly called the electrical double layer (EDL). EDL may be briefly described as follows: The electrode surface will spontaneously accumulate charge at the fluid/electrode interface to form EDL due to electrostatic interactions and thermodynamic consideration. Broadly, the sign of the charge accumulation, i.e., positive or negative, will depend on the Fermi level of the electrode relative to the fluid. For example, Au electrode in NaCl solution will preferentially attract more Chloride ions than Sodium ions. Typically, for 1 millimolar (mM) to 1 M aqueous solutions, the thickness of EDL is well below 100 nanometer (nm). As a result of EDL the electrode is at a finite resting potential ($E_R$) relative to the solution. If the EDL is perturbed by shear flow past the electrode surface, $E_R$ will change by $\Delta V_R$. After the perturbation is over, the system will equilibrate back to $E_R$, i.e., $\Delta V_R=0$. If the time dependent external stimuli causes a temporal shear flow at the electrode surface, the EDL is stripped causing a finite $\Delta V_R$. The invention is related to designing the device such that the $\Delta V_R$ for the two electrodes is different leading to generation of a time dependent electric potential between the two electrodes, $V(t)$, given by, $V(t)=(\Delta V_R)_2-(\Delta V_R)_1$, where $(\Delta V_R)_1$ and $(\Delta V_R)_2$ are the $\Delta V_R$ for the two electrodes, and t is time. If the response of the two electrodes to the shear flow is different, for example, due to physical and/or chemical differences between the two electrodes, $(\Delta V_R)_1 \neq (\Delta V_R)_2$, to therefore induce $V(t) \neq 0$. The central idea of the invention is to design an electrochemical device to obtain different $\Delta V_R$ on the two electrode by tailoring the physical and chemical properties of the electrode, composition of the fluid, and the overall structure of the device. The $V(t)$ generated can be used to detect the stimuli or harvest energy.

Detailed references will be made below with respect to specific illustrations to demonstrate the concept and function of the electrochemical device. Depending on the type of stimulation, the present invention is a family of devices with application in energy harvesting and sensor. More than one design will be discussed to practice the invention. Experimental data will be presented to demonstrate the concepts and design of device to practice the invention. The emphasis will be on the design of the electrochemical device, while non-limiting references will be made to the electrical circuit to interface the $V(t)$ generated from the device to electronics for signal processing for specific applications, such as, power generators and sensors.

2. Description of Related Art

As wearable and portable electronics gains significance for broad range of application, wired power sources, localized sources that require fuel or recharging or replacements, and wireless power supplies that usually require specialized infrastructures, are becoming limiting factors to realize the full potential of these electronic gadgets. The portable electronics have a wide range of applications, such as, communication, medical monitoring and therapy, entertainment, and sensors for a wide verity of applications, such as bridges, roads, manufacturing plants, and security. Self-powered devices with wireless communication or devices operated by miniature power devices generating energy from mechanical stimuli such as, motion and contact pressure due to walking, are becoming attractive approaches. For example, ankle motion can supply power of about 70 W, heel strike causing contact pressure can generate 2 W at a pace of two steps per second, and hip motion can yield about 50 W.[5] Wireless electronics powered by miniature generator integrated with the device that derives energy from mechanical vibration have been designed. Wearable and implanted electronics with wireless devices coupled with miniature generators are one of the main focus for innovation and research in healthcare devices. Self-powered devices driven by miniature power generators deriving power from ambient mechanical energy have been shown to power a variety of devices, such as, custom radio transmitter; temperature and humidity sensor; in vivo diagnostic device implanted in a knee and self-powered wireless network.

Spurred by the significant reduction in low power, miniature electronics with high functionality, especially sensors, miniature power sources with wireless communication has become an attractive approach. For example, wearable wireless medical device implanted in the body, generally called a body sensor network is a rapidly growing area for research and innovation. A Body sensor network is specific to a broader area of research and innovation, a wireless sensor network. The electrochemical devices of the invention described here, among other applications, can be used in conjunction with the existing wireless sensor network technologies, where the device can either be a power source generating electrical energy from ambient sources such as motion to power the sensor network; or a sensor element of the network that intrinsically generate the electrical signal that can be transmitted by wireless means to a receiver; or a combination of both the sensor element and power device.

Some of the first miniature generators were based on electromagnetic transduction with mechanical vibration as stimuli. The subject of miniature electromagnetic generators have been reviewed in the literature.

Electrostatic transduction is primarily based on modulation of capacitance by an external stimuli. For miniature generators, they are generally variable parallel plate capacitors where the distance between the plates, or the area of the plates are modulated by mechanical movement energized by the external stimuli. A well established approach to build self-powered or miniature power devices belongs to the general class of Micro Electro-Mechanical Systems (MEMS) devices. For MEMS based electrostatic energy harvester with associated control circuitry the constant voltage mode is superior to constant charge approach. A critical fabrication requirement for miniature MEMS based power generator deriving power from motion is achieving minimum gap between the electrodes to obtain high power density. This minimal gap requirement will ultimately limit the stability and robustness of the device.

Special material properties such as piezoelectric; magnetostrictive; triboelectric effect have also been explored to make self-powered or power devices. Based on the published reports, piezoelectricity is arguably the most pervasive principle to build miniature self-powered and energy generating devices. Piezoelectric in contrast to electrostatic transduction does not require an external charge source, i.e., priming, a key advantage. The piezoelectric transduction have also been coupled with electrostatic transduction to generate power from ambient vibration due to motion. Self-powered sensor for monitoring the strain in structure is shown using piezoelectric material. Kim et al. have patented a self-powered touch sensor based on piezoelectric transduction (Kim et al., US2014/0210313 A1). Henderson patented a multilayer device that may be installed in a floor to convert contact pressure due to walking into electricity (Handerson, US2002/0145350 A1). Jun et al. have patented a piezoelectric micro energy harvester using a simple process that responds over a broadband of mechanical vibration frequencies from the environments (Jun et al., U.S. Pat. No. 8,598,768 B2). Murphree has patented a device based on magnetostrictive effect to harvest energy from the vibrations due to gas flow (Murphree US2013/0119669 A1).

To increase the sensitivity to vibration and low level forces, fibers of piezoelectric materials have been investigated. To further enhance the sensitivity to low levels of mechanical energy such as vibration, contact pressure and motion, devices from piezoelectric nanomaterials, specifically nanorods have been developed. Several patents using nanorods or nanowire of piezoelectric materials have been described. Wang and Xu patented a stacked array of piezoelectric and conductive nanorods forming a Schottky barrier that is modulate to generate electricity on deformation (Wang and Xu, U.S. Pat. No. 8,003,982 B2). Using piezoelectric nanorods, Park and Cha invented a harvester to convert light to electrical energy (Park and Cha, U.S. Pat. No. 8,680,514 B2). Array of piezoelectric nanowires is shown to power light emitting diode for a short amount of time. Using balls coated with triboelectric material, Kim et al., have patented a device to generate power from friction between the balls and the surrounding substrate material (Kim et al., U.S. Pat. No. 8,536,760 B1) Kim et al. have patented graphene based triboelectric power generator (Kim et al., U.S. Pat. No. 8,519,596 B1).

An alternate transduction principle to convert ambient energy sources such as motion, mechanical vibration, and contact pressure to electrical energy are devices based on interfacial properties of ion containing fluids. Based on mobility of ions related to their size through a nanoporous material, Qiao has invented a device to convert mechanical energy to electrical energy (Qiao, US 2009/0243428 A1). In this method, by thermo-capillary effect or mechanically forcing the fluid through a porous membrane, a potential is generated across the membrane. By pressure driven continuous flow of ion containing fluid through a microfluidics channel, a streaming potential is generated by flow of ions in the Electrical Double Leyer (EDL), Chun and Choi have invented a microfluidics devices on the streaming potential principle (Chun and Choi, U.S. Pat. No. 7,674,545 B2). Another principle utilizing the charge accumulation in the EDL for generating temporal electrical signal is modulating the large capacitance of the EDL by changing the contact area of ion containing solution droplet with an electrode. The principle is used to make both sensor and a power device to harvest energy. Pan et al. have leveraged the transduction principle of capacitance modulation of EDL by squeezing a droplet by contact pressure to invent a self-powered sensor (Pan et al., US 2014/0174189 A1). The EDL capacitance can also be modulated by moving the ionic charge containing droplet between the electrodes to harvest energy. Krupenkin has invented an electrical energy generating device by laterally moving an ion containing charged droplet in a microfluidics channel by an external stimuli such as contact pressure (Krupenkin; U.S. Pat. No. 7,898,096 B1; and U.S. Pat. No. 8,053,914 B1). Carver et al. invented a device where EDL is as a capacitor to store charge that may be discharged by increasing the viscosity of the surrounding liquid (Carver et al., US 2014/0139974 A1).

The conditioning (i.e., processing) of the output signal from the device (that generates the electrical signal from the stimuli) is important for applications such as, energy storage and wireless communication. In context of energy harvesting from body motion, the mechanical energy source may be continuous, such as heart beat and blood flow; or discontinuous, such as walking or upper limb movement. For discontinuous source where the signal is in pulses, i.e., burst mode, the circuit requires internal feedback to store the charge from the burst.[31] Those with ordinary skill in the art will appreciate that based on the few examples referenced in this section, there are variety of non-limiting strategies to build electronic circuits for signal processing of the transient signal, V(t) generated by the electrochemical device related to the invention. A brief overview of the literature is given in the next paragraph to exemplify the vast variety of electronic circuits already developed that may be adopted as-is or with some refinement to process the signal generated from the family of devices related to the invention described here. The survey is not limiting but merely to appreciate the vast literature that may be leveraged to build the signal processing electronics for applications of the electrochemical device of the invention for sensing and energy harvesting from ambient energy sources. To those with ordinary skill in the art will appreciate that as ideas, know-how and technology progresses, it is entirely feasible that future development in circuit design for signal conditioning may benefit and refine the signal processing of the family of electrochemical device invented here for applications in energy harvesting and sensors.

The transient nature of the signal from devices based on piezoelectric material is qualitatively similar to the electrochemical device described here. In the published literature, circuits for signal conditioning for time dependent signal, similar to V(t), from piezoelectric based devices seems most pervasive. For example, the time dependent signal from the device is synchronized with the circuit characteristics to maximize efficiency of signal transfer for further processing. The synchronization, for example is claimed to improve the power harvested by 900%. Electrochemical capacitors or ultra-capacitors that store charge in EDL are also promising storage devices. The transient nature of V(t) generated in the invention described here is similar to the signal from piezoelectric material subjected to mechanical vibration. To those with ordinary skill in the art will appreciate that the signal from the electrochemical device will be in forms of pulses that would require signal conditioning for energy harvesting and sensing that is similar in nature to some of the non-limiting examples of circuits described in the literature and referenced in this section.

There is a substantial opportunity in developing novel miniature generator to power portable electronic devices for applications such as a wireless sensor network, wearable and implantable electronics, and portable electronic devices. There is also an opportunity to make self-powered sensors that directly generate an electrical signal from the stimuli that can be processed by low power electronics to make wireless devices. The opportunity lies in developing a device that can conform to the curved surfaces, is easy to manufacture, scale to large surface area, and uses non-toxic materials for easy recycling with low impact on the environment. The invention described here is based on principle that will lead to family of systems, such as, but not limited to, miniature power generators; self-powered sensors; and, large-area and low-thickness devices that may be installed in large structures. For example, a large-area, low-thickness device may be installed under a carpet to generate electricity from foot-fall as people walk on the carpet. Broadly, there is an opportunity in making class devices, such as, (a) miniature or large-area power generator to produce energy from ubiquitous ambient energy sources such as motion and vibrations; (b) self-powered device that intrinsically generates electrical in response to an external stimuli; and (c) complex systems where the device powers a electronic gadget to form a hybrid system, such as, wireless sensor network.

SUMMARY OF THE INVENTION

There is a growing need to develop portable electronics for a wide range of applications, such as, communication, medical monitoring and therapy, entertainment, monitoring health of bridges and roads, controlling and automating manufacturing processes, and security. For portability of generally low-power electronic devices, the energy required to operate is a bottleneck that limits the practical deployment of these systems. These limiting requirements juxtaposed with the rapid development and establishment of platforms for portable electronics, such as smart phones, has created a strong driving forces to develop, self-powered devices and miniature power generators that produce energy from ubiquitous ambient stimulations, such as, motion. Spontaneous electrical signal in the description implies that no external power source is required to generate the electrical signal from the external stimuli. The miniature power source may be complete or partial replacement of traditional sources, such as batteries. Applications of self-sustaining systems that are hybrids of miniature power generators and the low power electronics may have wide variety of applications, such as, in implantable biomedical devices for monitoring and drug delivery for therapy; wireless systems for sensing and security; and health monitoring of infrastructure.

The invention is directed to an electrochemical device that can, for example, convert mechanical energy to electrical energy to build miniature power devices; operate as self-powered sensing device; and power electronics to make self-sustaining hybrid systems. To facilitate the discussion, the application to sensing and power device will be described. However, it is understood that variety of hybrid device applications, are possible using the electrochemical devices related to the described invention. For example, the electrochemical device can be connected to low power electronics to develop self-sustaining, wireless, wearable electronics powered by motion, contact pressure, temperature gradients or their combinations. The external stimuli, for a sensing application, may be, but not limited to, mechanical vibration, sudden acceleration or deceleration, contact pressure, electric field, magnetic field, temperature gradient, or combination of stimuli.

Those with ordinary skill in the art will appreciate that there are variety of strategies for signal-processing of the transient signal, V(t) generated by the electrochemical device. The transient nature of V(t) generated is, for example, similar to the signal from piezoelectric material subjected to mechanical vibration that has been extensively studied and reviewed in the literature for energy harvesting and self-powered sensor application. The signal processing of the output of the electrochemical device, V(t), should not be considered limiting to the scope of the described invention.

The electrochemical device of the present invention can operate as a sensor or power generator that can be fabricated on large, flexible, curved surface with large areas. Certain embodiments of the invention can occupy an area of 1 $m^2$ over flat or curved surface where the substrate may be rigid or flexible. Typically, the substrate has a modulus of over 1 GPa with a top insulating surface comprising of plastic, ceramic or glass. The active component of the device may be as simple as aqueous solution of salts, such as NaCl. The device is based, at least in part on, two electrodes in a fluid containing ions that can be coupled to electronics to process the generated signal, V(t) for applications in sensing, energy harvesting and powering other electronics for applications such as, portable, wearable and/or implantable devices. The output V(t) of the device is generated by differential change in the interfacial charge distribution at the two electrodes due to temporal shear flow of the fluid at the fluid/electrode interface caused by an external temporal stimuli, such as, motion, pressure, electric field, magnetic field, or their combination. The key design feature of the electrochemical device is to obtain differences in chemical and/or physical structure between the electrodes to produce the time dependent electrical potential difference as the external stimuli perturbs the ion distribution at the fluid/electrode interface. There are four broad strategies that may be utilized individually or in combination to obtain differential charge distribution at the fluid/electrode interface between the two electrodes to obtain V(t) on temporal external stimuli:

A. The two electrode surface are chemically dissimilar leading to different resting potential, $E_R$ to obtain different $\Delta V_R$ on the two electrodes due to the stimuli.

B. The physical structure of chemically similar electrode is dissimilar leading to different $\Delta V_R$ on the two electrodes due to the same magnitude of stimuli.

C. The design of the fluid chamber containing the electrodes will be such that shear flow rate due to the stimuli over the two electrode is not equal to cause different $\Delta V_R$.

D. The design of the chamber is such that the two electrodes exposed to the same stimuli are in different fluid environment.

In general, in any of the four strategies, or their combination, the primary purpose is it produce a difference in electrode/fluid interfacial charge distribution due to the temporal perturbation, such that, $(\Delta V_R)_1 \neq (\Delta V_R)_2$. Examples to make practical devices based on the above four broad strategies and their combination to produce $\Delta V_R$ on perturbation will be discussed below. Brief outline of the two family of devices is given below to exemplify the conceptual working and a general approach to make devices to practice the invention. Examples with illustration of more specific examples of sensor and power devices is discussed in subsequent sections.

Sensor Device:

As a general matter, the sensor device of the invention comprises two electrodes on a support substrate residing in a chamber with ion containing fluid and electrical interconnection circuitry to connect the electrodes inside the chamber to application specific external electronics. Generally, the external electronics comprises capacitors, resistors, inductors and integrated circuit chips to process the electrical signal generated. The chamber may be hermetically sealed, or it may be open to in-going and out-going fluid. The external electronics are specific to the sensor application, for example, it may be an antenna with impedance matching circuit and signal amplification electronics to relay the signal to a receiver for signal processing. The interconnection between the electrodes and electronics outside the chamber to process the signal V(t) can be performed in several methods, such as, extending the electrode beyond the chamber, or connecting the electrode via a feed-thru across the walls of the chamber or the substrate supporting the electrode. One specific example is using a patterned circuit. This non-limiting example is to illustrate the electrochemical device based sensor. The patterned circuit is coated with an insulating layer to avoid electrical contact with the fluid. A typical insulating layer to cover the patterned circuit may be, for example, a solder mask used in printed circuit board (PCB) manufacturing. The substrate is a material with an insulating surface comprising, for example, hard polymer or ceramic. The electrical circuit patterned on the insulating substrate is made of metal, conducting glass, conducting ceramic or conducting polymer. The patterned circuit may be fabricated using standard technology, such as photolithography. For sensor applications, measurement of V(t) after signal processing will lead to sensing the characteristics of the external stimuli. More details on practical design of the electrochemical sensor device to practice the invention will be given in subsequent sections. One specific example is considered in this section to elucidate the implication of the invention to build a sensor device by generating $(\Delta V_R)_1$ and $(\Delta V_R)_2$ such that $(\Delta V_R)_1 \neq (\Delta V_R)_2$. The temporal external stimuli considered is contact pressure. The sensitivity of the electrochemical device to contact pressure depends on the design. For a typical design where the chamber is made of flexible polymer a contact pressure above 1 KPa, preferably above 50 KPa is required for a signal, V(t). To sense the applied contact pressure, in this example, the fluid chamber may comprise a flexible solid material that can be pressed to cause shear flow on the two electrode surfaces. The container may comprise flexible solid material, such as plastic, paper, metal, elastomer, rubber, or their composites to hermetically seal the fluid inside. Preferably, the container may comprise of flexible polymer may be an elastomer made from class of polymers, such as, siloxanes, hydrocarbons, polyesters, vinyl polymers, and polyethers. Owing to the flexible body of the container, it may be referred to as a bag. In one particular device design, the wall of the fluid chamber has a dimple that is aligned with one of the electrodes. As the external contact pressure stimuli is applied on the bag, the wall is pressed towards the two electrodes. On the expulsion or displacement of fluid on the electrode aligned with the dimple will be larger leading to higher shear flow. Due to the differential shear flow, $(\Delta V_R)_1 \neq (\Delta V_R)_2$ resulting in generation of V(t). Differential flow implies that the velocity gradient at the electrode surface under the dimple will be larger than that on the other electrode. The flexible bag with the dimple may be made of poly(dimethyl siloxane) (PDMS) using standard processes utilized to fabricate, for example, microfluidics devices.

Power Device:

As a general matter, the power device of the invention comprises two electrodes on a substrate immersed in a chamber containing the fluid with dissolved ions, and electrical interconnection circuitry to connect the electrodes inside the chamber to application specific external electronics. Generally, the external electronics comprise capacitors, resistors, inductors and integrated circuit chips to process the electrical signal generated. The chamber may be hermetically sealed, or it may be open to in-going and out-going fluid. The external electronics is to harvest energy from the V(t) generated due to external stimuli. The interconnection between the electrodes and electronics outside the chamber to process the signal V(t) for energy harvesting can be performed in several methods, such as, extending the electrode beyond the chamber, or connecting the electrode via a feed-thru across the walls of the chamber or the substrate supporting the electrode. One specific example is using a patterned circuit. The patterned circuit is covered with an insulating layer to avoid electrical contact with the fluid. A typical insulating layer to cover the patterned circuit may be, for example, solder mask used in PCB manufacturing. The substrate is a material with an insulating surface comprising of, for example, hard polymer or ceramic. The electrical circuit patterned on the insulating layer is made of metal, conducting glass, conducting ceramic or conducting polymer. The patterned circuit may be fabricated using standard technology, such as photolithography. The purpose of the patterned electrical circuit is to electrically couple the electrode inside the chamber to external electronics for energy harvesting. The details of the structure of the device will depend on the nature of energy source that is harvested. Typical sources of energy for harvest may be, but not limited to, mechanical energy in form of kinetic energy and pressure on the device by contact. One specific example is considered in this section to elucidate the implication of the invention to build a power device by generating $(\Delta V_R)_1$ and $(\Delta V_R)_2$ such that $(\Delta V_R)_1 \neq (\Delta V_R)_2$. For the purpose of illustrating the device, the energy source considered is mechanical energy harvested from contact pressure caused by foot stamping due to activities, such as walking and jumping. The sensitivity of the electrochemical device to contact pressure depends on the design. For typical design where the chamber is made of flexible polymer a contact pressure above 1 KPa, preferably above 50 KPa is required for a signal, V(t) to harvest energy. The device in the example may be installed either in the shoes of an individual or under a carpet that is subject to foot-fall form one or more individuals. To obtain energy from foot falls, the hermetically sealed chamber comprises a flexible or semi-flexible bag. Specifically, as the bag is pressed by foot, V(t) is generated due to differential flow over the two electrodes. The bag may be a tubing made of flexible polymer, such as Tygon® tubing. The electrodes are entangled wire in a gauze like shape. One electrode is made of all metal wire while the other electrode contains both metal and insulating wire where the latter is towards the outer surface. The gauze of the second electrode with metal and insulating wire may also be more densely packed. The metal may be a wire with outer surface composed of metals such as, but not limited to, Au, Ag, Pt, steel, alloys of Au and Sn, Ti, and Ta. The insulating wire is made from a wire where the top surface is insulating made from material such as, but not limited to, vinyl polymers, polyolofins, polyamides, polyimids, and siloxanes. In both type of wires, it is the top surface materials may be a coating or the entire bulk. The tubing is filled with fluid containing ions and is hermetically sealed. The two gauze electrodes are connected via a hermetically sealed feed thru. As the tubing is pressed the ions in the EDL due to shear flow on pure metal gauze electrode will be stripped. However the flow towards the core of the gauze will be screened due to the outer material. As a result the EDL in the center will be stripped less resulting in a smaller $(\Delta V_R)_1$ than if the gauze was a stretched wire. For the second electrode the hindrance will be larger because of denser packing and plastic. Thus, $|(\Delta V_R)_1| > |(\Delta V_R)_2|$, resulting in a V(t). The device is rugged because the gauze will not can break due to the contact pressure. The energy produced due to V(t) will be enhanced due to large surface to volume ratio of the gauze compared to a solid electrode occupying the same volume. The V(t) generated may be harvested by coupling the two electrodes to external storage electronics similar to some of the studies indicated in typical reference mentioned in the previous section.

To appreciate the principle of the device the ion concentration distribution at the electrode/fluid interface is considered. The ion may be from dissolved chemical compounds, such as, organic, inorganic or organo-metallic salts, acids or bases. The inorganic ions from the salts and acids and bases are at least one of the single and multivalent cation and anion. Examples of inorganic ions are, $Na^+$, $Cl^-$, $Na^+$, $Cl^-$, $Ba^{2+}$, $(SO_4)^{2-}$, $(SO_3)^{2-}$, $(HSO_3)^-$, $(Cr_2O_7)^{2-}$ $(ClO_4)^-$, and $(HPO_4)^{2-}$, $(HPO_4)^{2-}$ and $(PO_4)^{3-}$. The organic ions from salts acids and bases are single or multivalent cations or anions or zwitterions where at least one of the ionic species is organic or organo-metallic. Examples of organic ions are, pyridinium, acetate, citrate, quaternary ammonium, tropylium, guanidinium, DNA, polylysine, poly(styrene sulfonate) (PSS), poly(allylamine hydrochloride) (PAH), poly (diallydimethylammonium chloride) (PDDA), poly (dimethyl diallyl ammonium chloride) (PDAC), amino acids, and polypeptides. The solvent is a fluid such as, water. When a conducting surface comes in contact with fluid comprising of a solution containing ions, the ions are attracted towards the electrode surface. The attraction is explained by Coulomb's law due to formation of virtual "image charge" of opposite sign. For the purposes of simplicity, if specific chemical interactions between the ions and the electrode surface are ignored, the electrode surface will attract a specific sign of the charge depending on its Fermi level relative to the solution. For example, Fermi level of Au is lower than that of NaCl solution in water, causing more $Cl^-$ ions attracted towards the electrode surface compared to $Na^+$ ions. This accumulation of the charge at the electrode/solution interface is the well known electrical double layer (EDL). The thickness of EDL is characterized by the Debye length, $\kappa$. As concentration increases, $\kappa$ decreases. Typically, for monovalent salt, such as NaCl, $\kappa \approx 0.3/[c]^{1/2}$, where [c] is the salt concentration in Molar (M) and $\kappa$ is in nano-meter (nm). Including the diffused layer followed by compact layer at the electrode surface, the nominal EDL thickness is ~10$\kappa$. As a result of EDL, the electrode is at a finite resting potential, $E_R$ relative to the solution. For example, for aqueous NaCl in contact with an Au electrode, the latter is at a negative potential compared to the solution due to accumulation of more $Cl^-$ compared $Na^+$. As a result, $E_R < 0$. The $E_R$ is defined as the negative of the potential of zero charge (PZC), i.e., $E_R = -(PZC)$. For example, for 100 mM NaCl, $E_R$ is about −300 mV corresponding to PZC of about +300 mV.[36] The invention is related to perturbing the EDL by shear flow to change the potential between the solution and the electrode.

To appreciate the design, and function of the device, the primary mechanism of the device is discussed herein. The discussed mechanism in no way should be construed as limiting the scope of application of the device but viewed as expansion of other possible design of the device based on the principles discussed below. On external stimuli causing a shear flow past the electrode surface, the ions will by moved leading to disruption of the EDL. As the charged EDL layer is disrupted due to the flow, the potential between the electrode and the solution will change from $E_R$ to a new value, E. As the disturbance causes is temporal change, E is a function of time, t, i.e., E(t). Thus, the electrode potential, $\Delta V_R$ will change, given by, $\Delta V_R = E(t) - E_R$. Those with ordinary skill in the art will appreciate that E(t) is due to non-equilibrium distribution of charge at the fluid/electrode interface. In extreme situations, at high shear flow, $E(t) \rightarrow 0$. As a result, as the stimuli subsides and the system will equilibrate such that E(t) will approach $E_R$, i.e., $\Delta V_R$ will vanish to zero. Those with ordinary skill in the art will appreciate that the magnitude of $\Delta V_R$ will increase as the magnitude of shear flow due to external stimuli increases and the viscosity of the solution decreases. For example, for a viscous fluid, $\Delta V_R$ may be smaller. If the ions as larger, such as a polyelectrolyte, the $\Delta V_R$ will last for a longer time. Examples of polyelectrolyte are, DNA, poly(lysine), and poly(styrene sulfonate) (PSS). For example, for Au electrode in 100 mM NaCl solution, if the EDL is completely swept away due to the intermittent flow due to the perturbation, the potential will become same as the solution resulting in maximum $\Delta V_R$ of about +300 mV.

To produce V(t), the electrochemical device is designed such that, $\Delta V_R$ for the two electrodes, $(\Delta V_R)_1$ and $(\Delta V_R)_2$, are different. Generally, if no current is drawn from the device, $V(t)=(\Delta V_R)_2-(\Delta V_R)_1$ will be recorded on an ideal voltmeter. The recorded potential, V(t) measured by a high impedance voltmeter is conventionally referred to as open circuit potential in the art. Using the relationships for V(t) and $\Delta V_R$, $$V(t)=[E_2(t)-E_1(t)]-[(E_R)_2-(E_R)_1]=\Delta E(t)-\Delta E_R \quad (1)$$

where, $E_2(t)$ and $E_1(t)$ are the E(t) for the respective electrodes; $(E_R)_1$ and $(E_R)_2$ are $E_R$ for the respective electrodes; $\Delta E(t)=[E_2(t)-E_1(t)]$; and $\Delta E_R=[(E_R)_1-(E_R)_2]$. As a result, to obtain a large V(t), the design of the electrochemical device should be such that the sign of $\Delta E(t)$ and $\Delta E_R$ are opposite.

To appreciate the approach to design the electrochemical device, it is instructive to consider one ideal condition. In this ideal situation, the shear flow is large enough to completely strip-off the EDL. As a result, the electrode is at the same potential as the solution, i.e., $E_1(t)=E_2(t)=0$. As a result, the peak V(t), $V_{peak}=-\Delta E_R$. Thus, to maximize V(t), more specifically, $V_{peak}$, the electrodes should be designed such that $\Delta E_R$ is as large as possible, i.e., the difference in Potential of Zero Charge (PZC) of the two electrode should be as large as possible. In case of sensor application, $\Delta E(t)$ is proportional to the external stimuli (i.e., perturbation), the design should be such that $\Delta E(t)$ and $\Delta E_R$ has opposite sign. In case of power device the design should be such that the device operates close to ideal condition, i.e., $\Delta E(t)=0$. In both cases, the electrochemical device requires tailoring of $(E_R)_1$ and $(E_R)_2$ to obtain the largest possible $\Delta E_R$. Those of ordinary skill in the art will appreciate that the limitation on designing a practical device with largest possible $\Delta E_R$ are other factors, such as, cost of the device, durability, reliability, simplicity of the fabrication process, nature of the chemicals involved in making the device, life-time of the device, speed of the response, nature of the external stimuli, nature of the supporting dielectric substrate, and size of the device. There are at least three approaches to obtain different resting potentials, $(E_R)_1$ and $(E_R)_2$. Each of them is briefly considered with a typical example:

1. The two electrode surface may be made of two different conductive or semi-conductive material with reasonably different work functions leading to significant difference in Fermi Levels relative to the solution. Some examples of the electrode set may include, Au and Ag; Au and TaN/TaSiN; Au and Ta; and Au and Indium-Tin Oxide (ITO).
2. The two electrodes of same material surface may reside in two different solutions leading to difference in $E_R$. A typical approach may be the solution of same chemicals but different concentrations. For example, if the two $AgNO_3$ solutions of concentration ratio of 1:10 will lead to $|(\Delta V_R)_1-(\Delta V_R)_2|$ of about 59 mV when the two solutions are maintained at the same potential by connecting them with a metal wire such as Pt wire. Another example may be that one of the two solution contains an additive such as a polyelectrolyte such that on same perturbation, the EDL of the electrode with the polyelectrolyte is not swept away to the same level due to slow dynamics of the polyelectrolyte, leading to $|(\Delta V_R)_1-(\Delta V_R)_2|$.
3. The electrodes may be modified by a different polyelectrolyte layer that is thin enough to have reasonably high charge conductivity. For example, one Au electrode is coated with a positively charged polyelectrolyte and the other with a negatively charged polyelectrolyte. Examples of positively charged polyelectrolyte are, poly(allylamine hydrochloride) (PAH), poly(diallydimethylammonium chloride) (PDDA), poly(dimethyl diallyl ammonium chloride) (PDAC) and poly(L-lysine). Examples of negatively charged electrolyte are, poly(styrene sulfonate) (PSS), poly(acrylic acid) (PAA), and DNA. As the Au electrode attracts negative charge, another example may be, one electrode is coated with positively charged electrolyte while the other is bare Au.

The three approaches described above to tailor the PZC differential between the two electrodes by no means is complete, but they merely serve as example of strategies to demonstrate a method to fabricate practical devices for sensor and power generation applications based on the described invention.

Based on the described mechanism, those with ordinary skill in the art will appreciate that there are many alternative approaches to formulate the fluid to convert the external stimuli to shear flow at the fluid/electrode interface. For example, incorporating aqueous magnetorheological (MR) fluid with ion, a stimuli in form of a magnetic field can result in shear flow at the electrode/fluid interface to cause V(t). As indicated above, the V(t) generated by electrochemical device can be utilized to sense the external stimuli that causes the shear flow on one or both electrode surfaces. As indicated above, electrical energy may be harvested from the V(t) generated.

BRIEF DESCRIPTION OF THE DRAWINGS

The accompanying drawings and images, which are incorporated in and constitute a part of this specification, illustrate embodiments of the invention and together with the written description, serve to explain certain principles and features of the invention.

DETAILED DESCRIPTION OF PREFERRED EMBODIMENTS OF THE INVENTION

Figure 1:
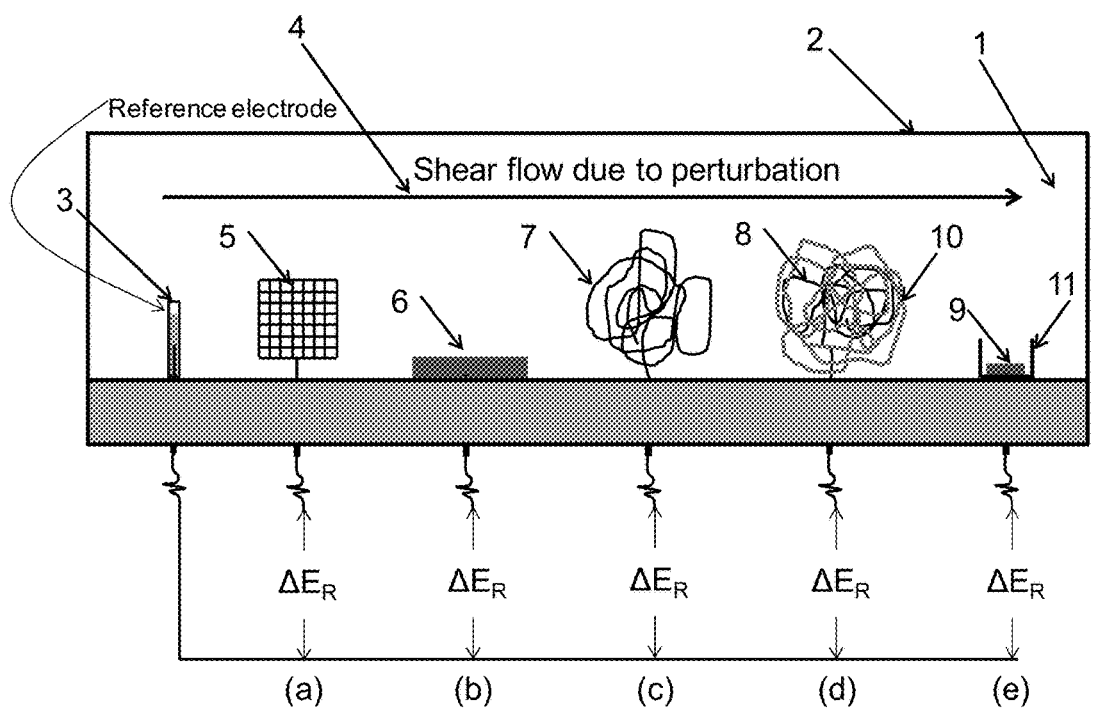
FIG. 1: Examples of different possible physical shapes of electrodes that may be incorporated in the electrochemical device.

Reference will now be made in details to various exemplary embodiments of the invention, examples of which are illustrated in the accompanying drawings. The following detailed description should not be understood as a limitation on the scope of the invention, but should rather be considered as it is intended—to provide details on certain features and aspects of the invention. The details below include examples to demonstrate the translation of the principle of the electrochemical device to practice the invention. The invention is a family of devices that spontaneously generate a potential, V(t) between two electrode when exposed to an external temporal stimuli that causes a shear flow at the interface between the fluid and the surfaces of the two said electrode. The illustrations below exemplify some designs to fabricate family of sensor and power devices.

The design and method depicted in the attached schematics are examples to better illustrate the invention and articulate at least one approach to making sensors and power devices, respectively to practice the invention. Specific approaches and designs of the electrode, fluid and sample chamber are considered to facilitate the description of the invention, and teach an approach to practice the invention. The supporting electronics to process the signal for sensing or harvesting electrical energy are based on methods described in the literature, as referenced in previous sections. Typical references are made to indicate the art to design and build the supporting electronics. To those with ordinary skill in the art will appreciate that future developments in low power electronics and integrated circuit chips may further enhance the performance of the supporting electronics to process the spontaneously generated V(t) by the electrochemical device for applications, such as, sensing and energy harvesting. Typical data is presented to demonstrate the feasibility of the invention.

The electrochemical device of the invention produces an electrical response when the external stimuli perturbs the fluid/electrode interfacial structure from its equilibrium state. Specifically, as the charge distribution in the electrical double layer (EDL) is perturbed from its equilibrium state by a shear flow at the surface of the electrode due to the external stimuli the potential between the electrode and the solution changes from $E_R$ to a new value, E. As the disturbance causes a temporal change, E is a function of t. The invention is thus producing different amounts of $\Delta V_R = E(t) - E_R$ on two electrodes due to a external stimuli. In one approach, to obtain different $\Delta V_R$ in the two electrodes exposed to external stimuli leading to the same shear flow perturbation, a strategy would be to tailor the physical property (FIG. 1), or chemical property (FIG. 2). To those with ordinary skill in the art will appreciate that relative design of the two electrodes may differ by combining differences in both physical and chemical structure of the two electrodes. Examples on the physical and chemical aspects of the electrodes will be made in reference to FIG. 1 and FIG. 2 to exemplify the concept of the invention to provide devices. The examples are merely to demonstrate the approach to practice the invention and not construed as limiting to the broad scope of the invention.

Figure 2A:
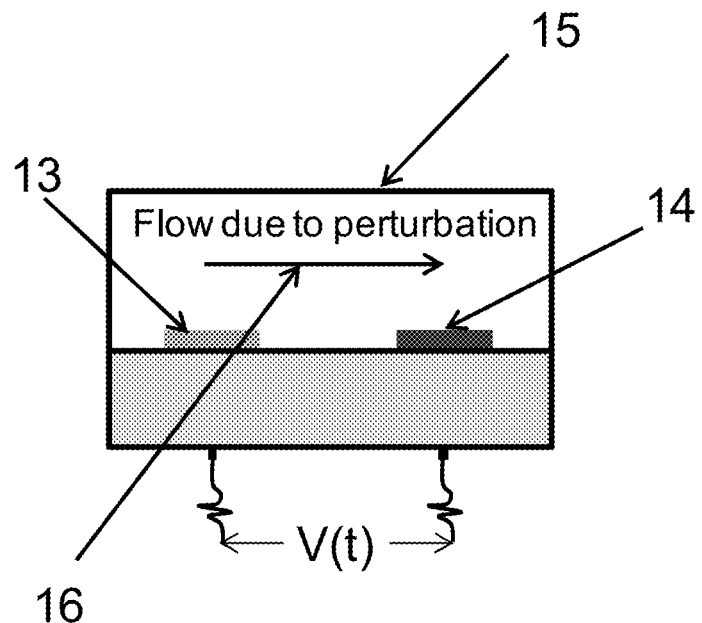
FIGS. 2a and 2b: Two examples of chemically different electrode surface for the electrochemical device.
Figure 2B:
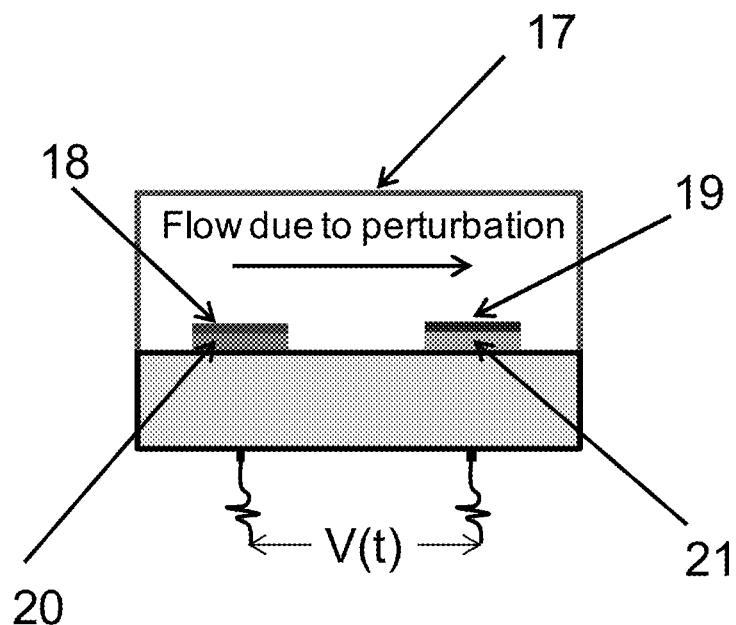

To appreciate the differences in the physical structure of the two electrodes, the invention can be carried out with the two electrodes constructed from the same material, i.e., the surface chemistry of the electrode in contact with the fluid is same, to obtain different $\Delta V_R$ of the two said electrodes, respectively. However, by changing the physical geometry of the electrode the potential $\Delta V_R$ in response to a given shear flow can be altered. The approach is illustrated in FIG. 1. Consider a fluid with ions (1) in a chamber (2). To aid the discussion, the potential of the fluid is fixed at potential depicted by a reference electrode (3). In an actual device the reference electrode will not be essential, the reference electrode in FIG. 1 is merely to conceptualize part of the concept of the invention. A typical reference electrode known in the art is Ag/AgCl that is described in standard texts on electrochemistry. To conceptualize the device, all the electrodes are subjected to same shear flow (4) at their respective surfaces due to an external stimuli. The potential of reference electrode does not change due to the temporal perturbation of shear flow (4). On exposure to same shear flow perturbation (4), different $\Delta V_R$ will be produced on each of the electrode (5,6,7,8,9) with respect to the reference electrode (3) even if the chemical composition of the electrode surface for all the electrodes is the same. The difference in $\Delta V_R$ is due to the amount of ion stripping caused by the shear flow. For example, in the mesh electrode (5) the flow will pass through the holes of the mesh resulting in efficient stripping of the ions in the EDL. In the planar electrode (6) the EDL ion stripping process may be slightly less efficient than mesh electrode because of boundary layer formation on the planar-electrode surface. In the gauze electrode (7) the inner part of the electrode may be shielded from the flow leading to lesser amount of ion stripping of the EDL than mesh-electrode (5). In a gauze of insulating polymer fiber (10) intertwined with the metal gauze electrode (8) the relative stripping may be lesser than pure metal gauze electrode (7). The difference in ion-stripping of the gauze will depend on the packing density of the gauze. The stripping of the ions of the EDL may be low to none if the electrode is in a baffle (11) that deflects the flow from affecting the EDL of the electrode. As a result, it is expected that the $\Delta V_R$ for baffle-electrode (9) will be lower than mesh-electrode (5) and planar-electrode (6). For the same packing density of the gauze, the $\Delta V_R$ for pure metal gauze-electrode (7) will be higher than composite-gauze-electrode with metal (8) and polymer fiber (10). Thus, combination of two electrodes with different shape but same Potential of Zero Charge (PZC) will have different $(\Delta V_R)_1$ and $(\Delta V_R)_2$, respectively, leading to a finite V(t) given by, $V(t) = (\Delta V_R)_2 - (\Delta V_R)_1$. Those with ordinary skill in the art will appreciate that the physical shape sketched in FIG. 1 are by no means exhaustive. For example, an electrode in a shape of crumpled sheet, or a combination of gauze and mesh electrode, are other possibilities not included in the limited list of shapes shown in FIG. 1 to tailor $\Delta V_R$.

In FIG. 1, examples were presented where the physical shape of the electrode leads to differences in $(\Delta V_R)$. In FIG. 2 examples are given where, the difference in $(\Delta V_R)$ between two electrodes is obtained by changing the chemical structure of one electrode compared to the other. For simplicity, to describe the general concept, the shape of the electrode will be a simple planar-electrode (i.e., 6). Those with ordinary skill in the art will appreciate that the tailoring of $\Delta V_R$ by chemical structure change can be performed on electrodes other than planar, for example, gauze-electrode (7) or mesh electrode (5).

To appreciate the differences in the chemical structure of the two electrodes, the invention is related to making the two electrodes from same shape, to obtain different $\Delta V_R$ of the two said electrodes, respectively. To illustrate the concept the shape is planar-electrode (i.e., 6). The invention is related to making the two electrodes with different materials, i.e., the surface chemistry of the electrode in contact with the fluid is different, to obtain different $\Delta V_R$ of the two said electrodes, respectively. In the invention, by changing the material of the electrode or modify the surface chemistry of the electrode made from same material or combination of the two, $\Delta V_R$ in response to a given shear flow can be altered. The idea is conceptualized in FIGS. 2(*a*) and 2(*b*). The planar-electrodes of two different materials (13 and 14) in a chamber (15) are subjected to same shear flow perturbation (16) due to external temporal stimuli will lead to finite V(t) (FIG. 2(*a*)). Owing to the difference in the chemical nature of the two electrodes, $E_R$ of the two electrodes (13 and 14) is different, i.e., $|\Delta E_R|>0$. Thus, as the two electrodes are exposed to the same shear field (16), a finite V(t) will be generated as the ions of the EDL are stripped by similar amount. Examples of electrode materials with different PZC, leading to different $E_R$ in a fixed solution are, Au, Ag, Ta, ITO, TaN/TaSiN, graphite, and conducting polymers, such as polyaniline, polythiophene, and polypyrrole.

Another approach to obtain $|\Delta E_R|>0$ is modifying the surface of the electrode (FIG. 2(*b*)). The two chemically similar or different electrode in a chamber (17) containing the fluid may be modified (18 and 19) to alter the $E_R$. For example, the electrode may be coated with a polyelectrolyte such as, PAH, PSS, poly(lysine), poly(diallyldimethylammonium chloride) (PDDA), poly (amic acid) PAA and deoxyribonucleic acid (DNA). The coated layer may be adsorbed or chemically grafted to the electrode surface. The coated layer may be a monolayer of a chemical moiety or a thicker film. Preferably, the coated layer is less than 100 μm. One common method of grafting is using the thio linkage to bind to Au. Those with ordinary skill in the art will appreciate that the underlining electrode (20 and 21) may be chemically the same or different. Owing to the difference in chemical nature of the coating used for surface modification, $|\Delta E_R|>0$. Thus, as the two electrodes are exposed to the same shear field due to the external stimuli, a finite V(t) will be generated as the ions of the EDL are stripped by similar amount.

Those skilled in the art will appreciate that the coating may be obtained by various methods, such as, chemical vapor deposition, spin casting, solution casting, chemical reaction at the surface, or a combination of these methods. One of the two electrodes may not be modified. To further exemplify the invention of generating V(t) by surface modification, a specific example is as follows: Both the electrodes (20 and 21) are Au where electrode 1 (say, 20) is coated with PAH while electrode 2 (i.e., 21) is coated with PSS. As a result electrode 1 and 2 will attract negative and positive ions from the solution, respectively leading to $(E_R)_1 \neq (E_R)_2$. Alternatively, electrode 1 may be coated with PSS while electrode 2 is unmodified. Another option may be that electrode 1 is coated with alkane-thiol so no EDL is formed while electrode 2 may be bare or modified with a polyelectrolyte.

Figure 3:
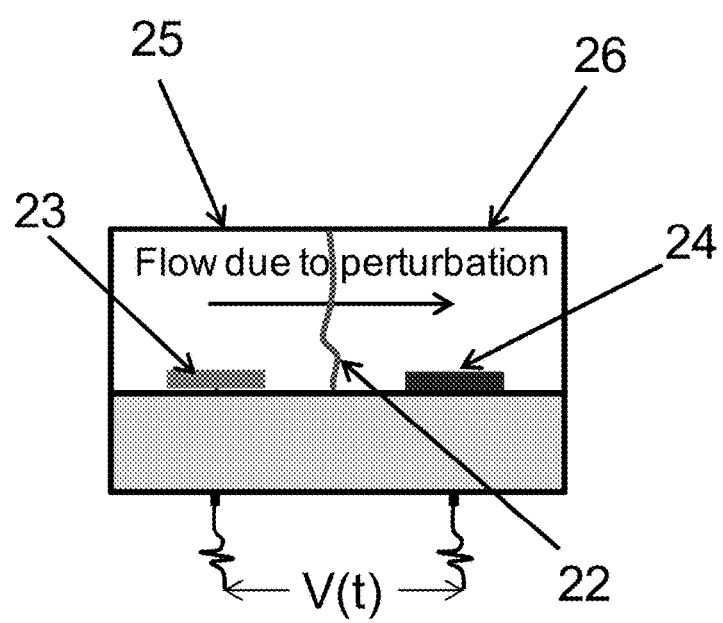
FIG. 3: Example of a conceptual fluid chamber exposing the two electrodes to different fluids.

Another concept to generate V(t) is to alter the chemical composition of the fluid rather than the chemical nature of the electrode (FIG. 3). In this approach, the chamber containing the fluid (i.e., 2, 15, and 17) is portioned by a physical barrier (22). The two electrodes (23 and 24) reside in different chambers (25) and (26), respectively. The fluid in the two chambers is different leading to difference in the $E_R$ of the two electrodes (23 and 24). For sake of simplicity, assuming that the shear flow due to perturbation caused by external stimuli is same, the finite $|\Delta E_R|>0$ will generate V(t) as the ion in the EDL are stripped.

Those skilled in the art will appreciate, depending on the application, numerous combinations of concepts discussed in FIG. 1, FIG. 2 and FIG. 3 are possible to tailor the desired V(t). The design of the device will depend on the application. For example, if the external stimuli is contact pressure, then, to cause shear flow on the electrodes due to the stimuli, the chamber of the device, i.e., 2, 15, 17, 25, and 26, will be made of flexible material that can easily deform to induce shear flow of the fluid past the electrode surface. Alternatively, if the external stimuli is motion, magnetic or electric, the chamber need not be flexible.

Figure 14:
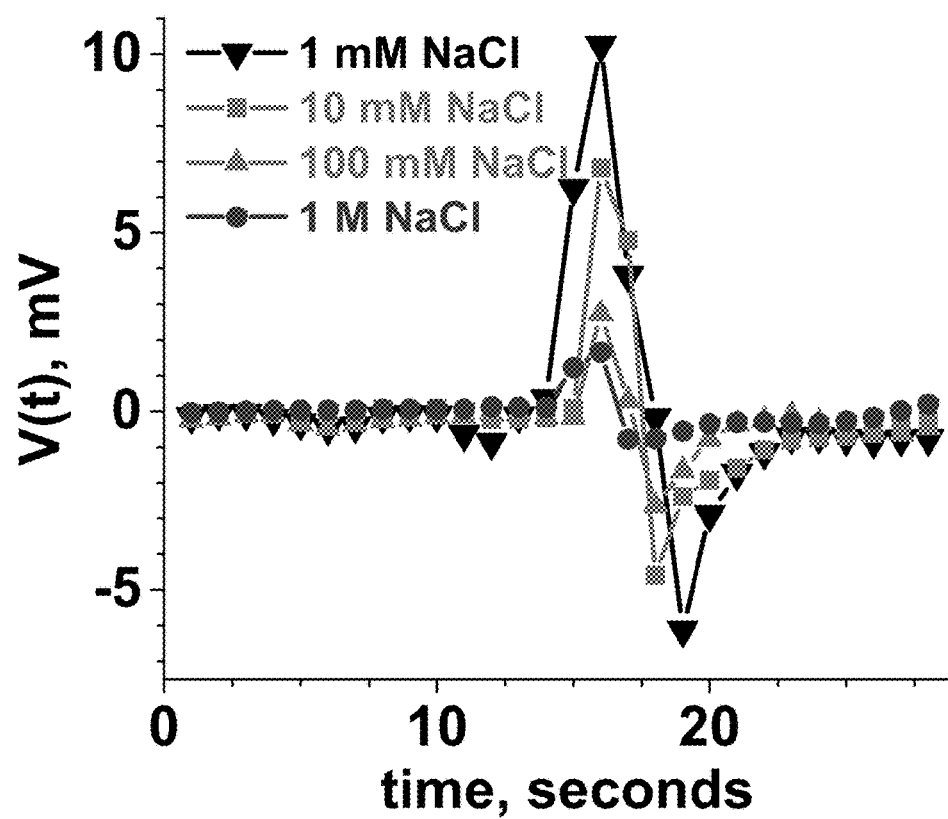
FIG. 14: Effect of ion concentration on the signal, V(t) from the electrochemical device shown in FIG. 12 with nominally fixed contact pressure.
Figure 15:
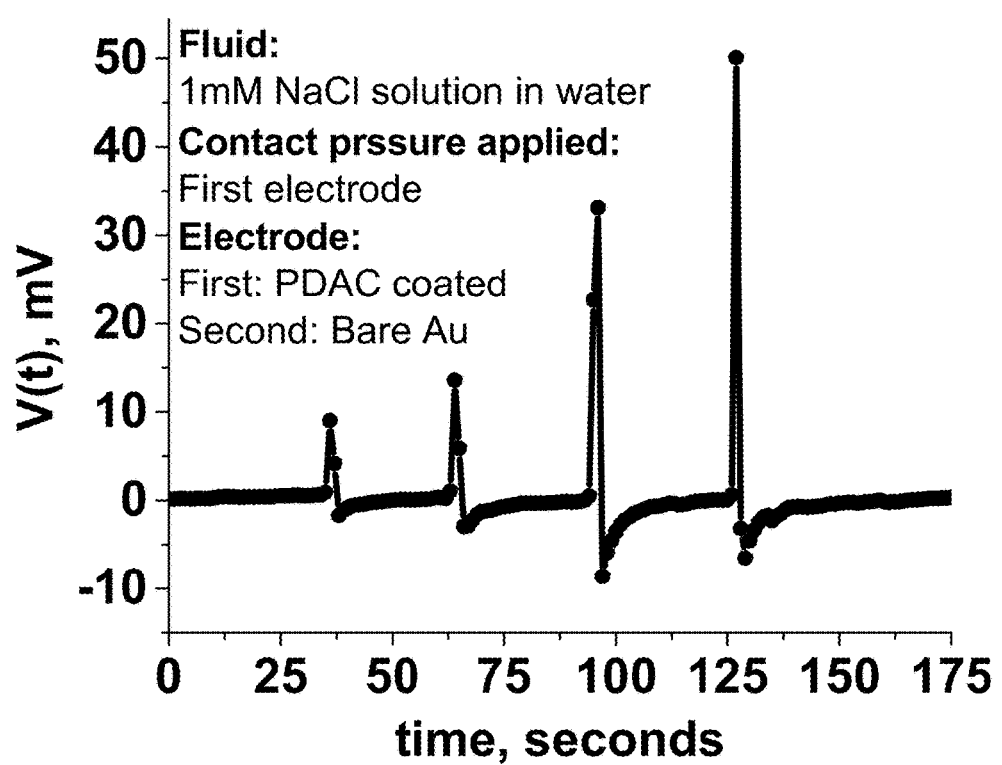
FIG. 15: Effect of increasing contact pressure on the signal, V(t) from the electrochemical device shown in FIG. 12 where the surface of one of the electrode is modified.

Those of ordinary skill in the art will appreciate the design of the device may use combination of both relative differences in physical shape, chemical nature of the electrodes, and structure of the fluid chamber, to obtain V(t). Specific examples will be given of devices to sense the external stimuli or harvest energy or both by generating V(t) due to external stimuli that causes a shear flow perturbation at the electrode surface in the device. Specific examples will be given below (FIG. 4 to FIG. 12) to elucidate the design features discussed in FIG. 1, FIG. 2 and FIG. 3 with certain applications. The examples in (FIG. 4 to FIG. 12) should not be construed as limiting but merely as illustrations to demonstrate the practice of the invention. A microfluidics device is designed and fabricated (FIG. 13) to demonstrate the feasibility of the concept for various electrode modifications and stimuli conditions (FIGS. 14 to 16). The examples and the data in FIGS. 4 to 16 in no way limits the scope of the invention but should be viewed to further underscore the underlining principles to apply the invention to make practical devices.

Figure 4A:
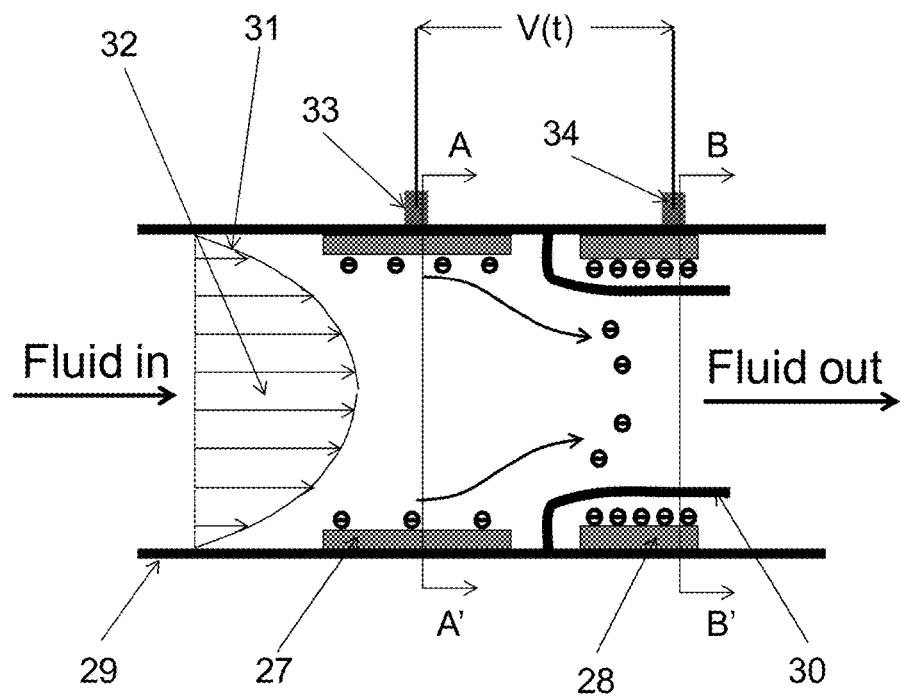
FIGS. 4a, 4b and 4c: Design of a flow meter or flow energy harvesting device based on the electrochemical device.
Figure 4B:
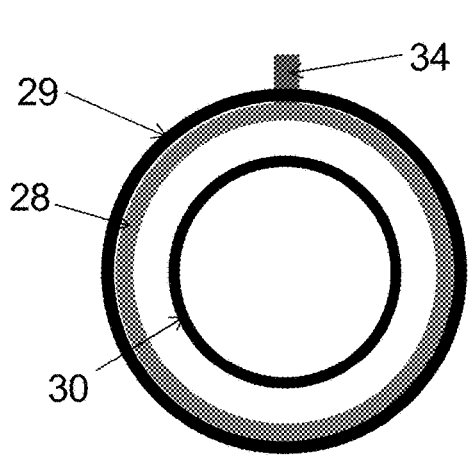
Figure 4C:
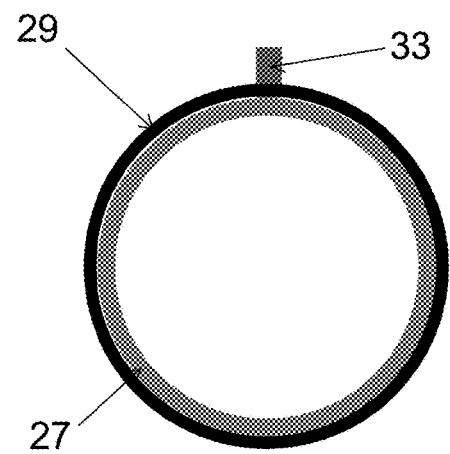

FIGS. 4*a*, 4*b* and 4*c* are directed to a flow meter using the baffle-electrode similar to 9 in FIG. 1. In this device the two electrodes (27 and 28) are inside a rigid chamber (29) made of materials such as, plastic, glass, ceramic, paper, metal, elastomer, rubber, or their composites. Generally, the modulus of the material is 200 MP, preferably 450 MPa. The chamber may be a portion of a tube that is part of a plumbing system. For a particular application the chamber is not hermetically sealed at two ends to allow the fluid to flow in and out. The baffle-electrode (28) is partially covered with a barrier (30) to prevent the flow to perturb the EDL on the electrode (28) due to flow, similar to electrode 9 barricaded by 11 in FIG. 1. The shape of the chamber may be a circular tube with the electrodes (27 and 28) and the barrier (30) line along the inner wall (Sections A-A' and B-B' in FIGS. 4*b* and 4*c*). Those with ordinary skill in the art will appreciate that cross-section of the chamber (29) other than circular are possible, such as, elliptical, triangular, or rectangular. The electrodes (27 and 28) and the barricade (30) may not cover the whole cross-section as shown but just a small sector. The device is attached to a ion containing fluid source indicated by "fluid in". Initially, when the tube is filled with the fluid, V(t) is nominally zero. As the source is turned on, due to the viscosity of the fluid, the flow produces a velocity profile that is slow at the walls of the chamber (31) and fast in the middle (32). Due to the shear flow at the wall, the ion in the EDL at outer electrode (27) is stripped. The ions on the surface of baffle-electrode (28) are not stripped because there the shear flow is prevented due to the barrier (30). As a result, similar to the baffle-electrode (9) in FIG. 1, a V(t) will be generated as the fluid-flow is either turned-off or turned-on. For steady state at constant flow rate, the potential V(t) will level-off to a steady state value, independent of time for an ion profile corresponding to the shear flow and the energetics of the static EDL.

The dynamic range of the flow may be controlled as follows: (a) If the EDL is weak, the EDL will be stripped at very slow flow rate. (b) While if the EDL is more stable, for example due to polyelectrolyte brush on the electrodes that may trap the ions, a larger shear flow would be required to completely strip-off the EDL. Thus surface modification can control the threshold shear flow required to completely strip the EDL. The V(t) may be measured by connecting the electrode to a feed-thru (33 and 34) to allow connections to electronics outside the chamber. The electronics may be to measure V(t) or to charge a capacitor to harvest energy. To operate the device as a sensor, V(t) will be measured by electronics with circuit similar to studies such as those reported in references cited in the previous section. The electronics may then be interfaced with a computer for data acquisition, analysis and storage. For example, the sensor device in conjunction with the electronics will detect the length of time the fluid is turned on. In another example, the device can measure the steady state value of V(t) to determine the flow rate suing a calibration curve. The calibration curve will depend on the ion content and viscosity of the fluid, and the geometry of the tube. By measuring the steady state value of V(t) compared to when the flow is zero the flow rate can be estimated. Determination of flow rate and the length of time the flow is turned on, the consumption of fluid can be estimated by the computer interfaced to the sensor device. The computer can record the usage of fluid. To those with ordinary skill in the art will appreciate that the feed-thru (33 and 34) connections can be connected to an antenna to relay the V(t) signal by wireless communication to a receiver interfaced with electronics interfaced with a computer for data acquisition, analysis, storage and data processing to measure the flow profile in real time. As a power device, the mechanical energy of the flow can be harvested by charging a capacitor with V(t) using electronics. Those with ordinary skill in the art will appreciate that the planar electrodes (27 and 28) for the sensor or power device may have other shapes, such as those described in FIG. 1 (i.e., 5, 7, and 8).

Figure 5A:
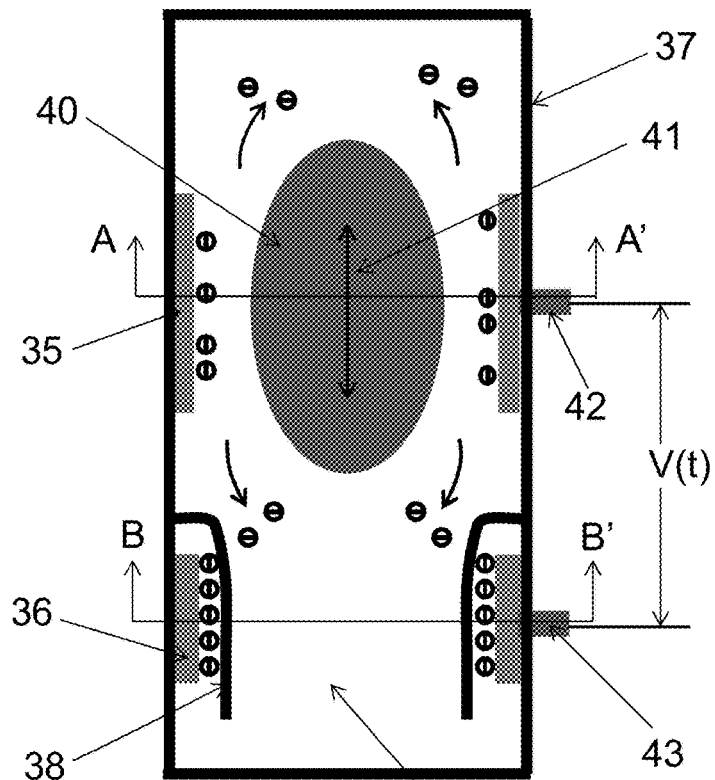
FIGS. 5a, 5b and 5c: Design of a device to sense motion or harvest energy from motion using the concept of electrochemical device.
Figure 5B:
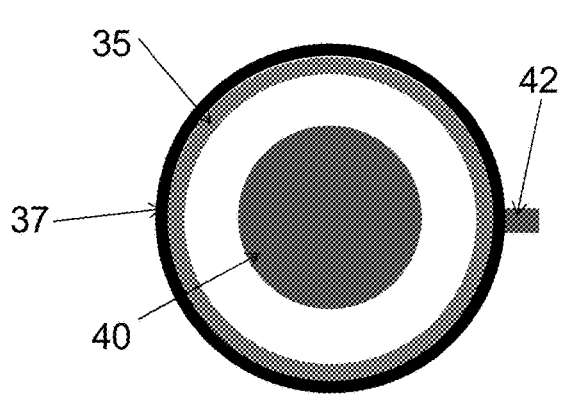
Figure 5C:
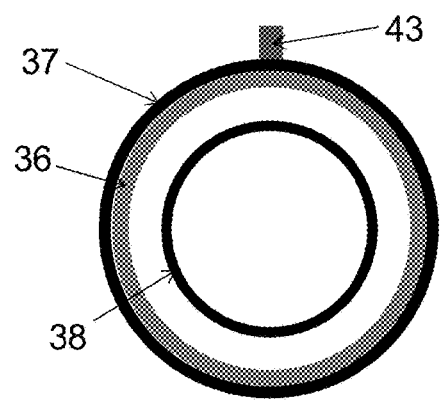

FIGS. 5a, 5b and 5c show a motion actuator using the baffle-electrode similar to 9 in FIG. 1. In this device the two electrodes (35 and 36) are inside a hermetically sealed rigid chamber (37) made of an insulator such as, plastic, ceramic, or glass. The baffle-electrode is partially covered with a barrier (38) to prevent the flow to perturb the EDL on the electrode (36) due to flow, similar to electrode 9 barricaded by 11 in FIG. 1. The shape of the chamber may be a circular tube and the electrodes (35 and 36) and the barrier (38) line along the inner wall (Sections A-A' and B-B' in FIGS. 5a and 5b, respectively). Those with ordinary skill in the art will appreciate that the cross-section of the chamber (37) other than circular are possible, such as, elliptical, triangular, or rectangular. The sealed chamber contains ion containing fluid (39), such as, aqueous solution of salt. The salt may be NaCl, $K_2SO_4$, and $CH_3COONa$ with concentrations in 10 M to 1 nM range, preferably in 1 M to 1 mM range. As the device is set in motion, the "float" (40) in the chamber will move along the axis of the chamber (41). The relative diameter of the float (40) and the baffle (38) may be such that the float (40) does not go past the baffle (38) to cause a back flow over the electrode (36). The motion of the float (40) will cause a shear flow of the fluid, leading to stripping of the ions in EDL on the electrode (35). The ions on the surface of baffle-electrode (36) are not stripped because the shear flow is prevented due to the barrier (38). As a result, similar to the baffle-electrode (9) in FIG. 1, a V(t) will be generated as the float (40) moves back and forth (41) due to the motion of the device. Those with ordinary skill in the art will appreciate the shape of the float (40) should be such that the movement (41) due to device motion is easy, preferably aerodynamic with low drag. The shape of the float (40) may be, for example, spherical, ellipsoidal, cylindrical, conical, or a combination of various shapes. The V(t) may be measured by connecting the electrode (35 and 36) to a feed-thru (42 and 43) to allow connections to electronics outside the chamber.

The electronics may be to measure V(t) or charge a capacitor to harvest energy. The electronics circuit for applications such as, energy harvesting, sensing, and wireless transmission will be similar to those referenced in the previous section. The sensor device in conjunction with the electronics will detect the motion of the object to which the device is attached. For example, the device may be attached to a person or an animal. As the living body moves, the motion may be recorded. To those with ordinary skill in the art will appreciate that the feed-thru (42 and 43) can be connected to an antenna outside the chamber (37) to relay the signal by wireless communication to electronics module with receiver, to make measurements of flow-on in real time with data acquisition, storage and signal processing performed by a computer. As a power device, the mechanical energy of motion can be harvested by charging a capacitor due to V(t) using electronics similar to those described in the literature and referenced in the previous section. For energy harvesting, the device can be attached to bodies in intermittent or continuous motion. Examples of such bodies include, ocean liners, walking or running people or animals, trains, and motor vehicles. Those with ordinary skill in the art will appreciate that the planar electrodes (35 and 36) for the sensor or power device may have other shapes, such as those described in FIG. 1 (i.e., 5, 7, and 8).

Figure 6A:
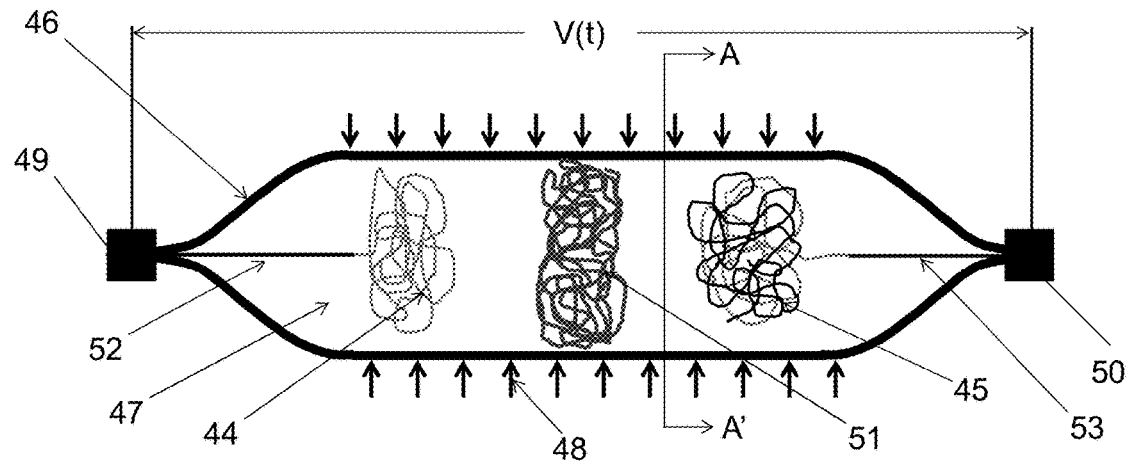
FIGS. 6a and 6b: Design of a device to sense or harvest energy from contact pressure using the concept of electrochemical device.
Figure 6B:
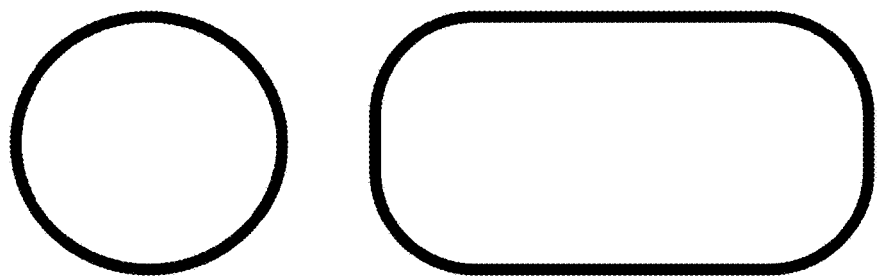

FIG. 6a is a pressure actuator device. The device comprises two electrodes (44 and 45) in a hermetically sealed flexible container (46) with ion containing fluid (47). The cross-sectional shape of the container may be, for example, circular, rectangular (see Section A-A' of FIG. 6b) or other shapes such as, triangular, semi-circular or trapezoidal. For illustration purposes the two electrodes (44 and 45) are gauze-electrodes (similar to 7 or 8 in FIG. 1). To obtain a finite $\Delta E_R$, the two electrodes may be made of different materials (similar to concept in FIG. 2(a)); or different surface modification (similar to concept in FIG. 2(b)); different gauze-shape (similar to electrodes 7 and 8 in FIG. 1); or combination of these said features. Other approaches to obtain V(t) from the electrodes (44 and 45) may be having same material with different packing density of the gauze. The flexible container may be made of a flexible polymer, such as PDMS, Tygon® tubing, or a flexible polymer film made of polymer such as, polyimide, polyester, nylon, vinylpolymer, polyolofin, or polyethers. In general, the electrodes may be made of other shapes, for example a mesh (similar to 5 in FIG. 1) or planar-electrode (similar to 6 in FIG. 1). Those with ordinary skill in the art will appreciate that gauze-electrode has the advantage of withstanding deformation as the device is subject to an external stimuli in form of a contact pressure (48). Due to the temporal pressing, i.e., contact pressure (48), the fluid (47) flows past the electrodes (44 and 45) to cause a potential V(t). The response of the device, V(t) is processed by connecting the electrodes through a feed-thru (49 and 50) to outside electronics. The signal processing electronics based on references described in the previous sections will depend on the application, such as, power harvesting or sensing the contact pressure and communicating it by wireless transmission. To facilitate the flow, the fluid (47) the container (46) may not be completely filled. To facilitate the flow, the container (46) may be stretchable. Example of a stretchable material may be from classes of rubbers, elastomers, and cross-linked polymers that can reversibly deform to strains of above 10%, preferably above 50%. The two electrodes may also be separated by a gauze (51). The purpose of the gauze (51) would be to avoid physical contact between the two electrodes. The barrier may also work as flexible partition (similar to 22 in FIG. 3) to allow two different fluids on either side of the partition (51). To facilitate the connection of the electrodes (44 and 45) to the electronics outside the container, the electrodes (44 and 45) are electrically connected to hermetically sealed feed-thru (49 and 50) via a conductor (52 and 53). The usage of the conductor (53 and 53) is optional, such that, the gauze may be directly connected to the feed-thru. Owing to high flexibility and deformability of the container (46), it may also be called a "bag".

The sealed bag (46) contains ion containing fluid (47). The ion may be from dissolved chemical compounds, such as, organic, inorganic or organo-metallic salts, acids or bases. The solvent is fluid such as, water. An example, of fluid may be, aqueous solution of salt, such as NaCl, $K_2SO_4$, and $CH_3COONa$ with concentrations in 10 M to 1 nM range, preferably in 1 M to 1 mM range. To operate the device as a sensor, V(t) will be measured by connecting the terminal at the end of feed-thru (49 and 50) to external electronics for signal processing similar to those referenced in previous sections. The electronics can be interfaced with a computer for data acquisition, analysis and storage. Those with ordinary skill in the art will appreciate that the feed-thru terminals (49 and 50) can be connected to an antenna to relay the signal to an electronics module by wireless communication to a receiver to measure V(t) in real time with data acquisition, storage and processing performed by a computer. The signal of V(t) can then be related to the external stimuli (48) to detect contact pressure. As a power device, the mechanical energy due to contact pressure can be harvested by charging a capacitor due to V(t) generated at the feed-thru terminals (49 and 50). The external electronics to harvest energy from V(t) will be similar to those described in the literature as referenced in previous section. For energy harvesting, the device can be subjected to activities where contact pressure is created. For example, in the sole of the shoes where an external stimuli of contact pressure is generated during activities, such as, walking, running, jumping. Another example is under a carpet where the foot fall from walking, running and jumping activities will create contact pressure stimuli on the device to generate V(t). Those with ordinary skill in the art will appreciate that the gauze electrodes (44 and 45) for the sensor or power device may have other shapes, for example, such as, those described in FIG. 1 (i.e., 5, and 6).

The illustrations described below in reference to FIG. 7 to FIG. 10 are based on microfluidics. The fabrication and materials used in microfluidics devices is typical technology used in the art. The dimensions of the microfluidics channel are typical, in 5000 to 1 μm range, preferably in 100 to 10 μm range. The plastic body to make the microfluidics device may made from a class of polyolofins, vinyl polymer, polysulfones, polyimid, polyamide, polysiloxane, polyethers or their copolymers. Preferable materials are poly(dimethyl siloxane) (PDMS), polyurethane and vinyl polymer. The thickness of the plastic body is typically, less than 1 cm thick, preferably between 1 μm and 5 mm. The substrates to support the microfluidics body will be typical materials used in the art, such as, glass, ceramics, paper, and rigid polymers. The metallization to make the electrode circuit may have a top surface of Au, Pt, conducting polymers, or other chemically inert conducting materials, such as, ITO. The fabrication process will be same as used in the art that include, lithography and three-dimension (3D) printing. To those with ordinary skill in the art will appreciate that modification of the microfluidics technology developed recently and in future may also be applicable as long as the structure and function exemplified in the application described in FIG. 7 to FIG. 10 can be obtained. The purpose of the examples of microfluidics devices is to demonstrate the versatility of the invention and in no way should be construed as limiting the scope of application of the device but viewed as expansion of other possible design of the electrochemical device.

Figure 7A:
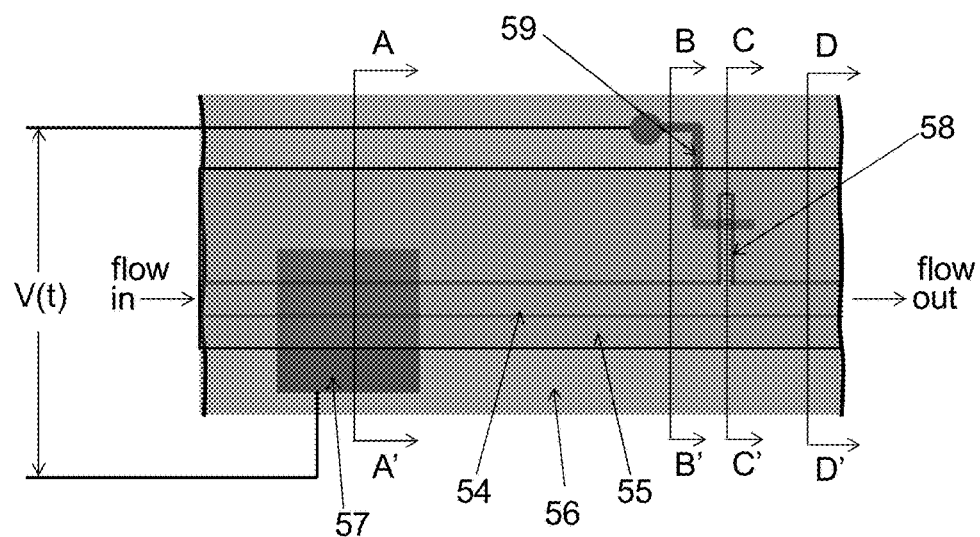
FIGS. 7a, 7b, 7c, 7d, and 7e: Design of a microfluidics device to sense or harvest energy from fluid flow using the concept of electrochemical device.
Figure 7B:
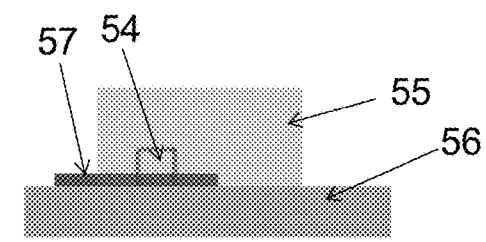
Figure 7C:
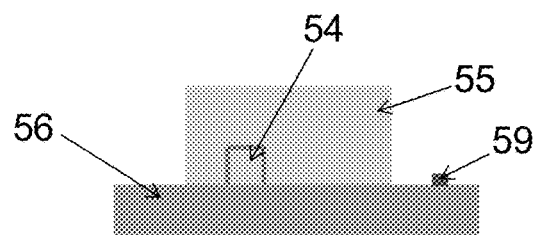
Figure 7D:
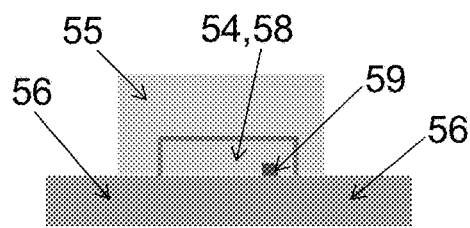
Figure 7E:
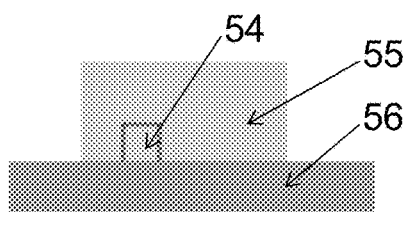
Figure 8A:
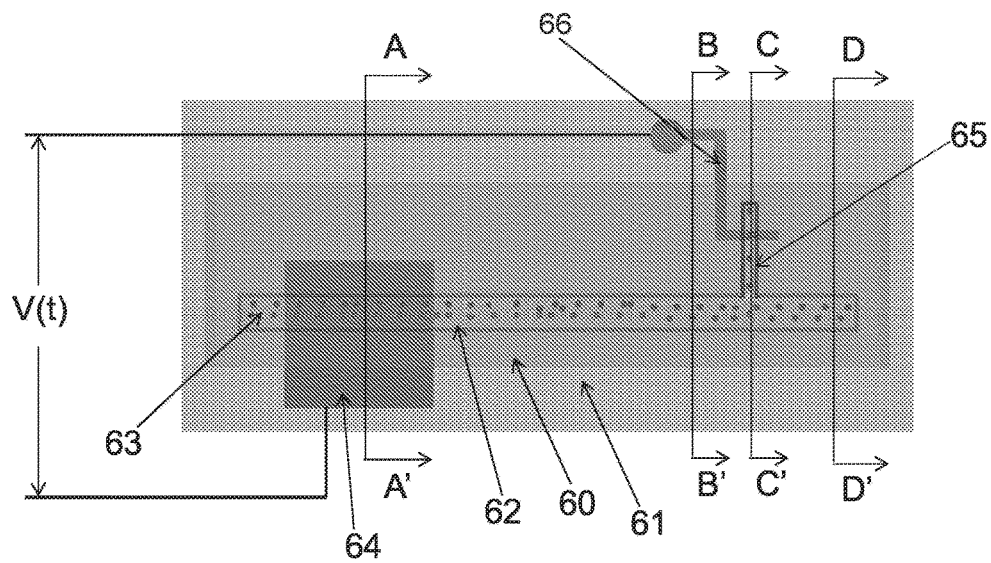
FIGS. 8a, 8b, 8c, 8d, and 8e: Design of a microfluidics device to sense or harvest energy from motion using the concept of electrochemical device.
Figure 8B:
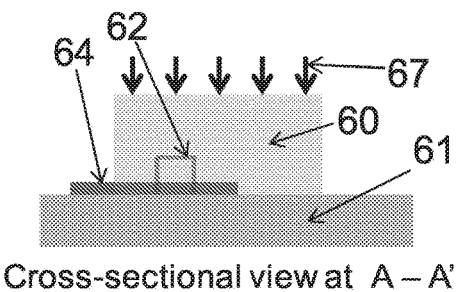
Figure 8C:
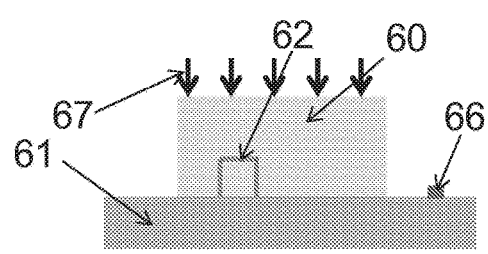
Figure 8D:
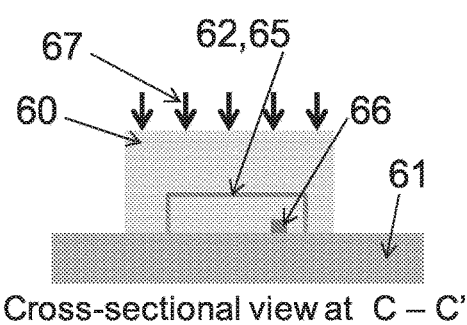
Figure 8E:
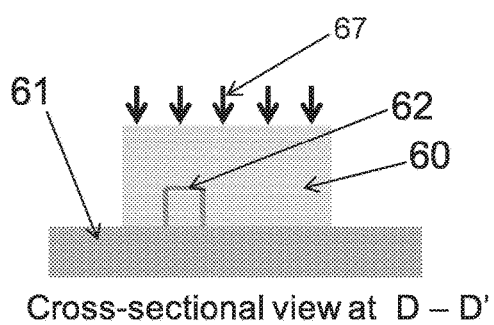

An application in microfluidics to measure flow in typical channel is shown in FIGS. 7a-7e. To illustrate the flow meter for microfluidics devices, a part of a typical channel (54) that may be part of a larger microfluidics device is shown in FIG. 7. The microfluidics device is made of typical materials used in the art that comprises a polymer body (55) on a substrate (56) that may be glass, paper, ceramic or a polymeric material. The invention comprises adding three components to the microfluidics channel (54): a first electrode (57) in contact with fluid in the microfluidics channel (54), an additional auxiliary channel connected to the main channel (58); and a second electrode (59) in contact with the auxiliary channel. The auxiliary channel is typically, at least 50% smaller than the main channel in terms of length and width. Section A-A' of FIG. 7b shows the interfacial contact between the fluid in the channel (54) and the first electrode (57) patterned on the substrate (56). Section B-B' of FIG. 7c shows the patterned second electrode (59) on the substrate (56) and below the microfluidics device body (55). Section C-C' of FIG. 7d shows the channel (54) of the microfluidics device connected to the auxiliary channel (58) and the patterned second electrode (59) on the substrate (56), and the body of the microfluidics device (55). Section D-D' of FIG. 7e shows the channel (54) of the microfluidics device engraved in the plastic body (55) and the supporting substrate (56). Initially, the channel is filled with the ion containing fluid. As the flow of the ion containing fluid flows through the channel (54) the EDL at the electrode (57) is stripped, while the EDL on electrode (58) is not perturbed because there is no significant flow in the auxiliary channel (58). As a result, similar to the baffle-electrode (9) in FIG. 1, a V(t) will be generated as the fluid-flow is either turned-off or turned-on. Similar to the electrochemical device in FIG. 4, the dynamic range of the flow can be altered by modifying the electrode (57) surface. Those with ordinary skill in the art will appreciate that the size of the auxiliary channel (58) is smaller than the main channel (54) to avoid any significant shear flow in the former when subjected to external stimuli. Typically, the width of the auxiliary channel (58) will less than 5000 μm, preferable ≤100 µm. For steady state at constant flow rate, the potential V(t) will level-off to a steady state value, independent of time.

The V(t) may be measured by connecting the terminals of the two electrodes (57 and 59) to electronics outside the chamber. The electronics to measure V(t) will be similar to those cited in the previous section. The electronics may be interfaced with a computer for data acquisition, analysis and storage. The imbedded sensor device (in FIG. 7) in conjunction with the electronics will detect the length of time the fluid is turned on. The imbedded electrochemical device in FIG. 7 may measure the flow rate of the ion containing fluid flowing through the channel. By measuring the steady state value of V(t) compared to when the flow is zero the flow rate can be estimated. To those with ordinary skill in the art will appreciate that the terminals of the electrodes (57 and 59) can be connected to an antenna to relay the V(t) signal by wireless communication to a receiver interfaced with a computer for data acquisition, analysis, storage and data processing to measure the flow profile in real time.

Another application of a microfluidics motion sensor is shown in FIGS. 8a-8e). The microfluidics device is made of typical materials used in the art that comprises a polymer body (60) on a substrate (61) that may be glass, ceramic, paper or a polymeric material. The channel (62) is an etched groove in the body (60) and adhered to the substrate (61). The method of fabrication of microfluidics device with hermetically sealed channel (62) and their assembly on substrate (61) is described in open literature and text books. The channel is filled with a liquid containing ions and particles (63). The sealed chamber, i.e., channel (62) contains ion containing fluid (63). The ion containing fluid may be a solution of salt, acid or base in a solvent, such as water and highly polar organic. For example, the fluid may be aqueous solution of NaCl, $K_2SO_4$, and $CH_3COONa$ with concentrations in 10 M to 1 nM range, preferably in 1 M to 1 mM range. The particles may be charged microbeads or colloids, such a latex particles. The preferable diameter of the particles is in 0.01 to 100 µm range. The purpose of the particles is to efficiently remove the ion from the EDL due to motion. Inclusion of particles will cause a more efficient removal of ions in the EDL due to shear flow. The inclusion of particles is optional. The first electrode (64) is in contact with fluid in the microfluidics channel (62). An additional auxiliary channel is connected to the main channel (65). Those with ordinary skill in the art will appreciate that the size of the auxiliary channel (58) is preferably smaller than the main channel (54) to avoid any significant flow in the former when subjected to external stimuli. Typically, the width of the auxiliary channel (58) will less than 5000 µm, preferable less than 100 µm.

The second electrode (66) is in contact with the auxiliary channel. Section A-A' of FIG. 8 shows the interfacial contact between the fluid in the channel (62) and the first electrode (64) patterned on the substrate (61). Section B-B' of FIG. 8 shows the patterned second electrode (66) on the substrate (61) and below the microfluidics device body (60). Section C-C' of FIG. 8 shows the channel (62) of the microfluidics device connected to the auxiliary channel (65) and the patterned second electrode (66) on the substrate (61), and the body of the microfluidics device (60). Section D-D' of FIG. 8 shows the channel (62) of the microfluidics device engraved in the plastic body (60) and the supporting substrate (61). As the device is externally stimulated by contact pressure (67) to cause a shear flow in fluid (63) a V(t) will be generated due different amount of shear flow on the first (64) and second (66) electrodes surface. The measurement of V(t) will sense the amount of contact pressure. Those with ordinary shill in the art will appreciate that the shear flow can also be caused by sudden movement, i.e., acceleration of the device. As a result, the device can be operated to sense contact pressure and/or sudden movement. The V(t) may be measured by connecting the terminals of the two electrodes (64 and 66) to external electronics outside the chamber for signal processing based on circuits similar to those cited in references in the previous section. In one possible electronics configuration, the low power electronics can process the signal, V(t) from the device and transmit it by wireless communication to a receiver which can be interfaced with a computer for data acquisition, analysis and storage. The sensor device in conjunction with the electronics will detect the external stimuli which may be, applied contact pressure (62) or acceleration of the device. To measure acceleration of a object, the device may be attached to the object from the back side of the substrate (61). To those with ordinary skill in the art will appreciate that the terminals of electrodes (64 and 66) can be connected to an antenna to relay the V(t) signal by wireless communication to a receiver interfaced with electronics interfaced with a computer for data acquisition, analysis, storage and data processing to measure the external stimuli which may be, applied contact pressure (62) or acceleration of the device. Potential application of the microfluidics device with antenna may be to measure sudden acceleration by attaching the device to objects such as, tennis racket, baseball or cricket bat, or an automobile. The potential application of the microfluidics device with antenna may be having the device attached to boxing gloves to measure impact force.

Figure 9A:
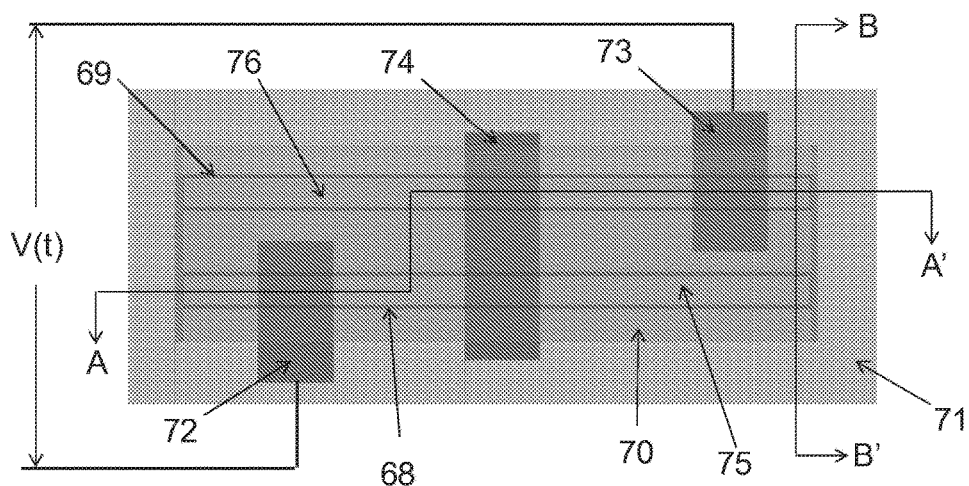
FIGS. 9a, 9b, and 9c: Design of a microfluidics device to sense or harvest energy from contact pressure using the concept of electrochemical device.
Figure 9B:
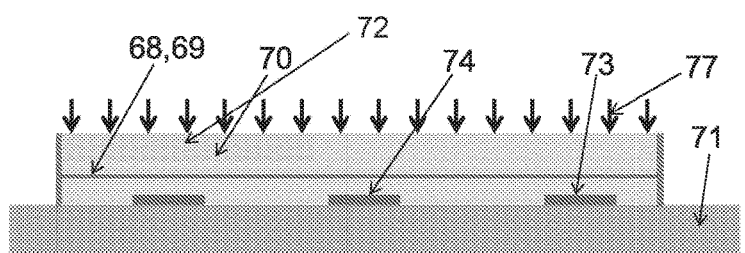
Figure 9C:
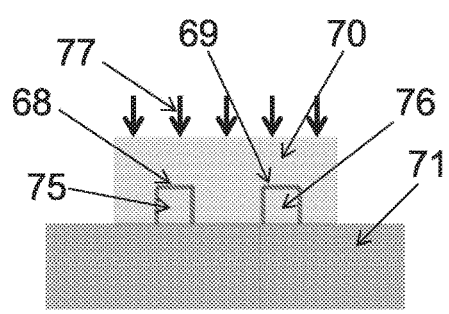
Figure 10A:
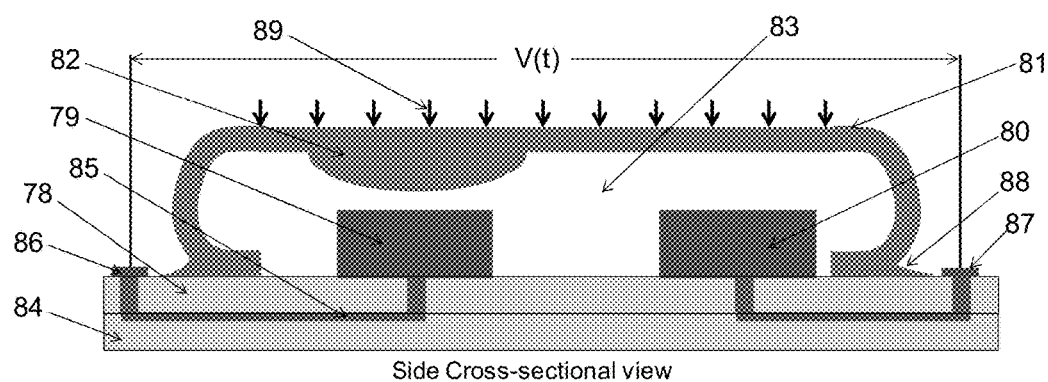
FIGS. 10a and 10b: Design of a device to sense or harvest energy from contact pressure using the concept of electrochemical device.
Figure 10B:
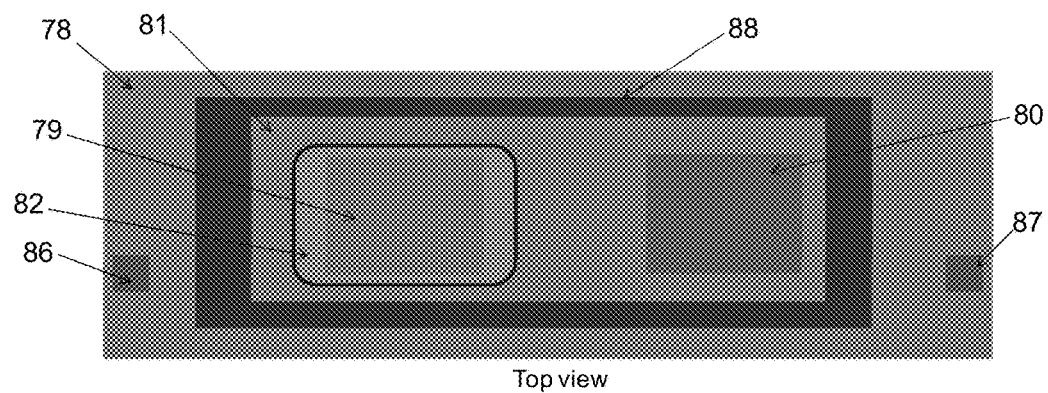

FIGS. 9a-9c show an application of a microfluidics sensor device to measure external stimuli where the two electrodes reside in different chambers. The general concept of the device is described above in FIG. 3. In one typical design, the device comprises two channels (68 and 69) engraved in a plastic body (70). The plastic body (70) is supported on a substrate (71) with three electrodes (72,73, and 74). The electrodes (72,73, and 74) are patterned on the substrate (71). The first electrode (72) is in contact with fluid in the first channel (68). The second electrode (73) is in contact with fluid in the second channel (79). The third electrode (74) connects the fluid (75) in first channel (68) to fluid (76) in second channel (69). Section A-A' and Section B-B' of FIGS. 9b and 9b show the cross-section of the device. The purpose of the third electrode (74) is keep the fluids (75 and 76) at same Fermi level when no stimuli is applied. In the simplest case, the first and second electrodes (72 and 73) are of the same material and the fluids (75 and 76) are different. The difference in fluid may be different ionic compounds; different concentrations of the same type of ions; or combination of the ion chemistry and concentration. As the Fermi levels of the two fluids are maintained at the same potential, there will be a finite $\Delta E_R$. On external stimuli, such as contact pressure (77) the charge in EDL for both the electrodes (72 and 73) will be stripped. As shown in equation (1), for complete stripping of the EDL i.e., $\Delta E(t) \rightarrow 0$, a finite V(t) of magnitude $\Delta E_R$ will be generated. Those with ordinary skill in the art will appreciate that larger $\Delta E_R$ can be tailored by modifying the electrode surface chemistry (similar to 13 and 14, or 18 and 19 in FIG. 2). Incorporating particulates in the fluid for one or both the channels (68 and 69), similar to illustration in FIG. 8, the device can be used to detect sudden acceleration, i.e., motion. Similar to (a) and (b) for device in FIG. 4, by modifying the electrode with tethered polyelectrolyte the level of EDL stripping can be reduced to increase the range of stimuli measured. The V(t)

may be measured by connecting the electrode to electronics outside the chamber using the terminals of the two electrodes (72 and 73). The electronics to measure V(t) for sensing the stimuli or energy harvesting will be similar to those cited in the previous section. The electronics can be interfaced with a computer for data acquisition, analysis and storage. To those with ordinary skill in the art will appreciate that the terminals of electrodes (72 and 73) can be connected to an antenna to relay the V(t) signal by wireless communication to a receiver interfaced with electronics interfaced with a computer for data acquisition, analysis, storage and data processing to measure the external stimuli, i.e., contact pressure or sudden acceleration. Potential application of the microfluidics device with antenna may be to measure sudden acceleration by attaching the device to objects such as, tennis racket, baseball or cricket bat, an automobile, or a person. The potential application of the microfluidics device with antenna may be having the device attached to boxing gloves to measure impact force.

An alternate approach different from the invention aspects conceptualized in FIG. 1 to FIG. 3 and devices described in FIG. 4 to FIG. 9 are possible. In one alternate approach shown in FIGS. 10a and 10b, the device comprises a substrate (78) with first (79) and second (80) electrode; and a flexible container (81) with a dimple (82) interposed above the first electrode (79) filled with ion containing fluid (83). To interconnect the electrodes (79 and 80) to outside electronics, one approach would be to have a two layer substrate (78 and 84) with a circuit (85) to connect each of the electrode to terminals (86 and 87). To avoid leakage of the fluid, the container (81) is hermetically sealed (88) to the substrate (78). As an external stimuli is applied as contact pressure (89) on the flexible container (81) the fluid (83) over the electrodes (79 and 80) is displaced. The displacement of fluid (83) causes a shear flow on the electrodes (79 and 80) to strip the ions in the EDL. The dimple (82) will lead to larger amount of shear flow over the first electrode (79) compared to the second electrode (80) resulting in larger $\Delta E(t)$ on the first electrode. If the chemical and physical structure of the two electrode is same, $\Delta E_R$ is zero. As a result, V(t) will be generated due to $\Delta E(t)$, i.e., difference in shear flow between the two electrodes (79 and 80). Those with ordinary skill in the art will appreciate V(t) can be tailored by also incorporating finite $\Delta E_R$ by changing the relative chemical and physical structure of the electrode, such as modify the two electrodes by positive and negative polyelectrolytes, or use different materials for the electrode.

The V(t) may be measured by connecting the electrode to electronics outside the chamber using the terminals of the two electrodes (86 and 87). The electronics to measure V(t) will be similar to those cited references in previous sections. To those with ordinary skill in the art will appreciate that the terminals of electrodes (86 and 87) can be connected to an antenna to relay the V(t) signal by wireless communication to a receiver interfaced with electronics interfaced with a computer for data acquisition, analysis, storage and data processing to measure the external stimuli, i.e., contact pressure or sudden acceleration. As a power device, the mechanical energy due to contact pressure can be harvested by charging a capacitor due to V(t) generated at the terminals of the electrodes (86 and 87). The external electronics to harvest energy from V(t) is similar to those described in the previous section. For energy harvesting, the device can be subjected to activities where contact pressure is created. For example, in the sole of the shoes where an external stimuli of contact pressure is generated during activities, such as, walking, running, jumping. Another example is under a carpet where the foot fall from walking, running and jumping activities will create contact pressure stimuli on the device to generate V(t). Those with ordinary skill in the art will appreciate that device, similar to illustrations in FIG. 6,8 9 can be used as sensor to measure the contact pressure.

Figure 11:
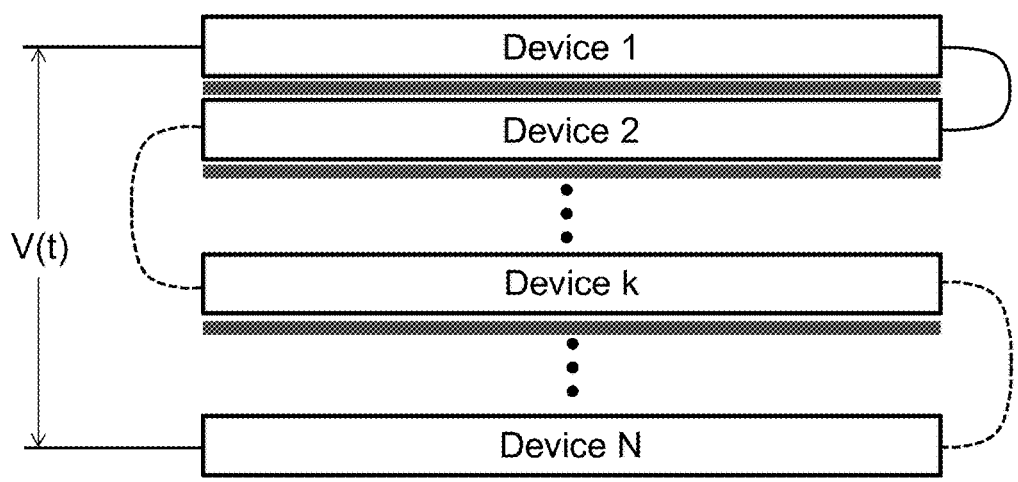
FIG. 11: Stacking of several electrochemical devices.

The flat nature of the devices can be leveraged to stack the power devices (FIG. 11). The terminals of the electrodes in FIGS. 6,8 and 9 can be connected in series to increase the total V(t) of the power device. Those with ordinary skill in the art will appreciate that the device can also be connected in parallel to deliver higher current at same V(t). Other configurations may be combinations of parallel and series connection. Those with ordinary skill in the art will appreciate that stacking the device has other advantages. For example, for a wireless device, combining the devices in parallel will amplify the current relative to single device increasing the current through the antenna which will increase the range of the wireless signal.

Figure 12:
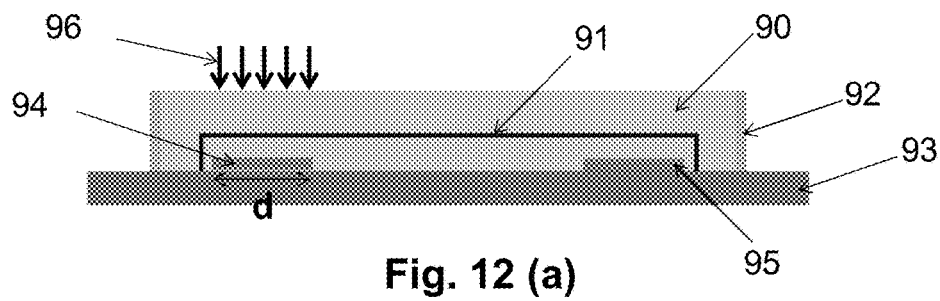
FIGS. 12*a*, 12*b* and 12*c*: Design and fabrication of a microfluidics device to experimentally study and demonstrate the concept of electrochemical device.
Figure 12:
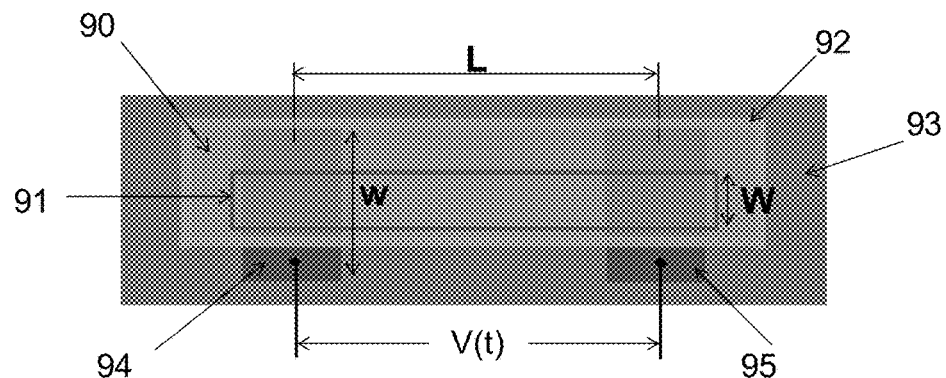
Figure 12:
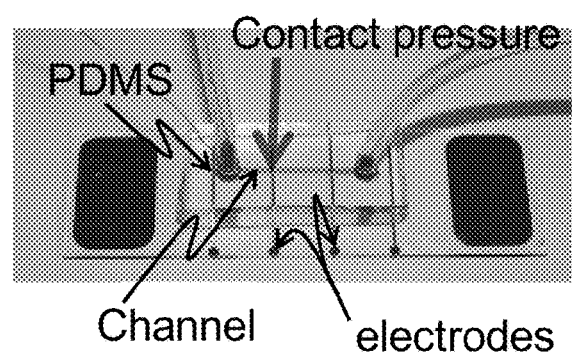

In the next set of illustrations (FIGS. 12 to 15) data on microfluidics device is discussed to exemplify the concept of the invention using one typical design. FIGS. 12a and 12b show the schematic of the device with the critical design features and FIG. 12c is an optical image of the actual device. A poly(dimethyl siloxane) (PDMS) body (90) with W=200 μm and about 10 mm long channel (91) is hermetically sealed (92) to a glass substrate (93) (FIGS. 12a and 12b). The distance between the electrodes (94 and 95), L=5 mm. The Au electrodes deposited on the substrate (93) has w=10 mm and d=0.5 mm. The thickness of the Au electrode is about 200 nm. The ion containing fluid is injected in the channel via two Tygon® tubes shown in the optical image (FIG. 12c).

Figure 13:
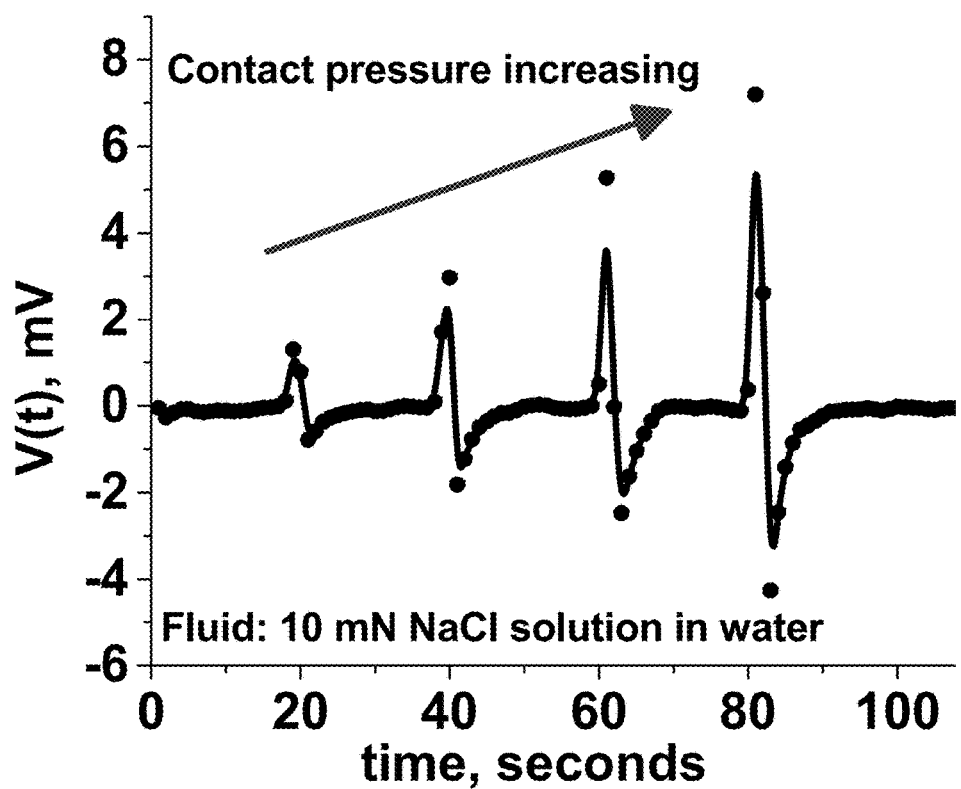
FIG. 13: Effect of increasing contact pressure on the signal, V(t) from the electrochemical device shown in FIG. 12.

FIG. 13 shows the first set of data from a device described in FIG. 12. In this example, the surface of both the electrodes (94 and 95) in FIGS. 12a and 12b are Au. Intermittent local contact pressure (96) is applied on first electrode (94) at intervals of about every 20 seconds (FIG. 13). For each contact pressure pulse every 20 seconds, the contact pressure is slightly increased. A V(t) is generated between the electrodes and recorded by a voltmeter interfaced with a compute. The generation of V(t) is attributed to displacement of ionic charge in the EDL of the first electrode (94) while no significant shear flow occurs on the surface of second electrode (95). As the contact pressure (96) increases the V(t). The example illustrate that the principle described in the invention can measure local contact pressure by measuring the V(t) generated between the electrodes (94 and 95) due to displacement of ion containing fluid. The fluid was aqueous solution of 10 mM of NaCl.

FIG. 14 shows the effect of ion content on device response. In this example, the surface of both the electrodes (94 and 95) in FIGS. 12a and 12b are Au. Intermittent local contact pressure (96) is applied on first electrode (94) of same magnitude on devices with fluid in the channel (91) containing different amount of ion concentration. The V(t) is measured as described for FIG. 14. Only one pulse for each ion concentration is shown to illustrate the difference in V(t) generated. As the ion concentration increases the magnitude of the V(t) pulse decreases. The observation is attributed to the thickness of the EDL. As the ion concentration reduces the EDL becomes thicker and the concentration distribution in the EDL is more diffused. As a result, the striping of the EDL becomes easier as the concentration reduces leading to larger signal. The device can have application as sensor to measure the total ion content in the solution by calibrating the signal as a function of salt content at constant contact pressure.

FIG. 15 shows the effect of surface modification on the device response. In this example, the first electrode (94) is modified by coating a less than 100 nm thick film of polyelectrolyte, PDAC. The device concept is similar to that discussed in FIG. 2(b). The magnitude of applied contact pressure (96) applied on the first electrode (94) increases over the range similar to the illustration in FIG. 13. Comparing the response of the device in FIGS. 13 and 15, the increase in signal due to PDAC modification is about 6-fold. The reason in the observed enhancement is attributed to two reasons: first, the concentration of ions in the fluid for the device in FIG. 15 is lower than device in FIG. 13 resulting in the effect shown in FIG. 14; second, the positive charge of PDAC will further lower the Fermi level of the electrode relative to the solution leading to larger $\Delta E_R$ to cause a higher V(t). The illustration exemplifies the ability to significantly increase in device performance for application in sensing and energy harvesting by engineering the design of the electrodes.

The data shown in FIGS. 13 to 15 support the basic concept of the device discussed in FIGS. 1 to 3 that may be utilized to fabricate devices discussed in examples shown in FIGS. 4 to 12. The illustration collectively demonstrate that the concept of striping the ions in the EDL by a temporal stimulus will generate an electrical polarization between two electrodes that can be used for applications such as, sensing and power generation. By connecting the device directly to an antenna, self-powered wireless devices can be fabricated. The examples collectively indicate that the device can be fabricated using methods known in the art. The devices can be networked in series or parallel to increase the total V(t) or current, respectively.

The invention claimed is:

1. An electrochemical device comprising:
   a chamber configured to hold a fluid;
   a fluid disposed in the chamber, said fluid containing dissolved ions,
   first and second electrodes immersed in the fluid filled chamber, and
   wherein, when the fluid is subjected to an external mechanical, electrical and/or magnetic stimuli that causes a shear flow on at least one of the electrodes, a potential between the first and second said electrodes is generated.

2. The device of claim 1 wherein the electrodes comprise at least one of: metals, conducting polymer, polyelectrolyte film, semiconducting elements and compounds, metal filled conductive adhesives and composites, semimetals, and composites of these materials.

3. The device of claim 1 wherein the fluid contains at least one moiety of dissolved organic ions, dissolved inorganic ions, and suspended macro-ions in a solvent media.

4. The device of claim 3 wherein the solvent media is a single or multicomponent solution of water and polar organic liquids of molecular dipole moment of above 1.6 Debyes, and preferably above 3 Debyes.

5. The device of claim 3 wherein the inorganic ions are class from small ions of valency less than eight.

6. The device of claim 3 wherein the inorganic ions comprise at least one of: $Na^+$, $Cl^-$, $Na^+$, $Cl^-$, $Ba^{2+}$, $(SO_4)^{2-}$, $(SO_3)^{2-}$, $(HSO_3)^-$, $(Cr_2O_7)^{2-}$ $(ClO_4)^-$, and $(HPO_4)^{2-}$, $(HPO_4)^{2-}$ and $(PO_4)^3$.

7. The device of claim 3 wherein the organic ions comprise at least one of: pyridinium, acetate, citrate, quaternary ammonium, tropylium, guanidinium, DNA, polylysine, poly (styrene sulfonate) (PSS), poly(allylamine hydrochloride) (PAH), poly(diallydimethylammonium chloride) (PDDA), poly(dimethyl diallyl ammonium chloride) (PDAC), amino acids, and polypeptides.

8. The device of claim 3 wherein the suspended macro-ions are at least one of: charged nanoparticles and macroparticles.

9. The device of claim 1 wherein the chamber includes at least one flexible wall.

10. The device of claim 1 wherein the device includes a substrate and the chamber is disposed within the substrate.

11. The device of claim 1 wherein at least one of the electrodes comprise at least one of: a wire gauze with at least one wire having an electrically conducting surface; a thin film having an electrically conducting surface; and a mesh having an electrically conducting surface.

12. The device of claim 1 wherein at least one of the electrodes is coated with a top polyelectrolyte film.

13. The device of claim 1 wherein at least one of the electrodes has immobilized organic molecules chemically tethered to the surface.

14. The device of claim 1 further including a baffle shielding at least one of the electrodes.

15. The device in claim 1 wherein the device is a microfluidics device with the chamber comprising at least two channels engraved in a polymer film that is sealed to a substrate.

16. The device in claim 15 wherein the substrate has patterns of at least two conducting transmission lines with each connecting an electrode that interface with the fluid inside each channel to a terminal pad for interfacing with external electronics.

17. The device in claim 15 further including a plurality of stacked devices arranged in at least one of: a serial and parallel connection.

18. The device of claim 1 further including a particulate suspension disposed in the fluid.

* * * * *